United States Patent
Zarzar et al.

(10) Patent No.: US 11,953,439 B2
(45) Date of Patent: Apr. 9, 2024

(54) ARTICLES AND METHODS FOR GENERATION OF TUNABLE COLORATION AND INTERFERENCE

(71) Applicants: Massachusetts Institute of Technology, Cambridge, MA (US); The Penn State Research Foundation, University Park, PA (US)

(72) Inventors: Lauren Dell Zarzar, State College, PA (US); Sara N. Nagelberg, Somerville, MA (US); Mathias Kolle, Hull, MA (US); Amy Goodling, Cary, NC (US)

(73) Assignees: Massachusetts Institute of Technology, Cambridge, MA (US); The Penn State Research Foundation, University Park (PA)

( * ) Notice: Subject to any disclaimer, the term of this patent is extended or adjusted under 35 U.S.C. 154(b) by 944 days.

(21) Appl. No.: 16/543,254

(22) Filed: Aug. 16, 2019

(65) Prior Publication Data
US 2020/0056996 A1 Feb. 20, 2020

Related U.S. Application Data

(60) Provisional application No. 62/765,032, filed on Aug. 17, 2018.

(51) Int. Cl.
*G01N 21/64* (2006.01)
*B29D 11/00* (2006.01)

(52) U.S. Cl.
CPC ... *G01N 21/6452* (2013.01); *B29D 11/00298* (2013.01); *G01N 2201/0446* (2013.01)

(58) Field of Classification Search
CPC ....... G01N 21/6452; G01N 2201/0446; B29D 11/00298
(Continued)

(56) References Cited

U.S. PATENT DOCUMENTS 3,481,663 A 12/1969 Greenstein
6,384,979 B1 * 5/2002 Whitehead ............ G02F 1/1677
359/263

(Continued)

FOREIGN PATENT DOCUMENTS

EP 1825311 B1 * 4/2009 ............ F21V 14/003
JP H2-134529 U * 11/1990
(Continued)

OTHER PUBLICATIONS

Invitation to Pay Additional Fees mailed Oct. 10, 2019 for Application No. PCT/US2019/046910.
(Continued)

*Primary Examiner* — William Choi
(74) *Attorney, Agent, or Firm* — Meunier Carlin & Curfman LLC

(57) ABSTRACT

The present invention generally relates to the generation of tunable coloration and/or interference from, for example, surfaces, emulsion droplets and particles. Embodiments described herein may be useful for generation of tunable electromagnetic radiation such as coloration (e.g., iridescence, structural color) and/or interference patterns from, for example, surfaces (e.g., comprising a plurality of microdomes and/or microwells), emulsion droplets and/or particles. In some embodiments, the surfaces, interfaces, droplets, and/or particles produce visible color (e.g., structural color) without the need for dyes.

25 Claims, 16 Drawing Sheets

(58) Field of Classification Search
USPC .................................. 359/665, 666; 264/1.1
See application file for complete search history.

(56) References Cited

U.S. PATENT DOCUMENTS

| | | |
|---|---|---|
| 6,449,081 B1 | 9/2002 | Onuki et al. |
| 2009/0041633 A1 | 2/2009 | Dultz et al. |
| 2010/0252751 A1 | 10/2010 | Klunder et al. |
| 2015/0377900 A1 | 12/2015 | Salafsky et al. |
| 2017/0010465 A1* | 1/2017 | Martinez .................. G02C 7/02 |
| 2017/0033250 A1 | 2/2017 | Ballif et al. |

FOREIGN PATENT DOCUMENTS

| | | |
|---|---|---|
| WO | 2014/178184 A1 | 11/2014 |
| WO | 2019222567 A1 | 11/2019 |

OTHER PUBLICATIONS

European Patent Office. Communication pursuant to Rule 164(1) EPC. Issued in EP Application No. 19850111.6 dated May 17, 2022. 14 pages.
International Searching Authority (ISA/US). International Search Report and Written Opinion. Issued in PCT Application No. PCT/US2019/046910 dated Dec. 6, 2019. 11 pages.
Anonymous, "Total internal reflection", XP055917414—<https://en.wikipedia.org/wiki/Total_internal_reflection>May 1, 2022 (May 1, 2022).
European Patent Office. Supplementary European Search Report issued in EP Application No. 19850111.6 dated Aug. 18, 2022.

* cited by examiner

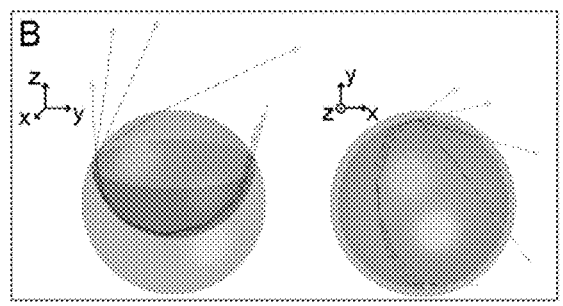
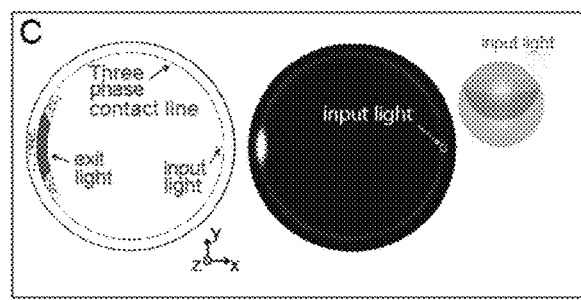
FIG. 1B                    FIG. 1C

ARTICLES AND METHODS FOR GENERATION OF TUNABLE COLORATION AND INTERFERENCE

RELATED APPLICATION

This application claims the benefit under 35 U.S.C. § 119(e) of U.S. Provisional Application No. 62/765,032, filed on Aug. 17, 2018, and entitled "ARTICLES AND METHODS FOR GENERATION OF TUNABLE COLORATION," which is incorporated herein by reference in its entirety for all purposes.

STATEMENT OF GOVERNMENT SUPPORT

This invention was made with Government support under Grant No. DMR1533985 awarded by the National Science Foundation (NSF). The Government has certain rights in the invention.

FIELD OF THE INVENTION

The present invention generally relates to the generation of coloration and/or optical interference from, for example, interfaces, surfaces, emulsion droplets and particles.

BACKGROUND

Control of color-inducing light-matter interactions has been of profound interest to humans, including scientists, engineers, designers, and artists, for millennia. Many different physical phenomena lie at the origin of color. For example, quantum processes are generally at play when light is absorbed with spectral selectivity by pigments and dyes. Material-specific optical dispersion may allow for separation of visible white light into colors using prisms and causes atmospheric rainbows. The interference of light waves within periodic nano- and microstructures, such as thin films, optical gratings, and photonic crystals, may produce iridescent "structural colors" which can be, for example, brighter, non-fading, and more spectrally controllable than pigments and dyes. Many of nature's most stunning color displays rely, at least partially, on structural colors with prominent examples including peacock feathers, butterfly wings, tropical fruits, and cephalopods. The approaches by which such color can be produced is of significant scientific and practical interest, with many industries including textiles, food, personal care, transportation, coatings, and interior design showing aspirations to use structural colors to replace hazardous dyes and hard-to-source pigments from their products. However, current strategies to enable structural coloration have not yet found wide-spread industrial use due to challenges related to restrictions in suitable combinations of materials systems, structuring processes, and limits in controlling the required material structures to the extent necessary to generate the desired structural color. Accordingly, improved compositions, methods, and articles are needed.

SUMMARY OF THE INVENTION

The present invention provides compositions and methods for the generation of coloration and/or interference patterns from, for example, emulsion droplets, surfaces, interfaces, and particles.

In one aspect, articles are provided. In some embodiments, the article comprises a first component and a second component adjacent the first component and an interface between the first component and the second component, the interface configured such that at least a portion of electromagnetic radiation incident to a surface of the interface undergoes total internal reflection between the first component and the second component, wherein the first component has a first refractive index greater than a second refractive index of the second component (where the refractive indices of the first and second components are defined for the same wavelength of electromagnetic radiation).

In another aspect, methods are provided. In some embodiments, the method comprises providing an article comprising a first component, a second component adjacent the first component, and an interface between the first component and the second component, exposing a surface of the interface to electromagnetic radiation such that at least a portion of the electromagnetic radiation undergoes total internal reflection, wherein the first component has a first refractive index greater than a second refractive index of the second component (where the refractive indices of the first and second components are defined for the same wavelength of electromagnetic radiation).

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

FIG. 1B shows ray tracing modeling of TIR at the internal interface of a hydrocarbon and fluorocarbon droplet in water, according to one set of embodiments;

FIG. 1C shows modeling (left) and experimental (right, captured from a single droplet exposed to a focused light beam at the right droplet edge) of ray exit points for light incident in a tightly focused cone, according to one set of embodiments;

(FIG. 2B) Transmission and reflection optical micrographs. Color is only seen in reflection. Inset, side-view image of a representative droplet. Scale, 100 μm; (FIG. 2C) Photograph showing that the color arises from individual droplets rather than from higher order diffraction; (FIG. 2D) A petri dish filled with a monolayer of droplets illuminated with white light exhibits iridescence when viewed from different angles. Scale, 5 mm; (FIG. 2E) The color separation due to TIR at the internal interface can also clearly be observed in micrographs of single droplets (diameter~100 μm); (FIG. 2F) A map of the color separation generated from the droplets by using a half ping-pong ball as a translucent projection screen. Scale, 1 cm for right image, 50 micron for left image. Light from a collimated white LED is used to illuminate a small area of droplets in the petri dish, according to one set of embodiments;

(FIG. 3B) The same domes as in (FIG. 3A) but submerged in water; (FIG. 3C) The domes used in (FIG. 3A) can be replicated into the inverse well structure and filled with a higher index material (solid or liquid). An example combination of materials would be solid polydimethylsiloxane and benzyl benzoate fluid, according to one set of embodiments;

(FIG. 4A) Schematic and optical micrograph showing the biphasic droplet geometry and composition used in FIGS. 4B-4D. The droplets orient with gravity with the denser perfluorohexane side downward, as shown. Scale, 25 µm; (FIG. 4B) A petri dish containing a monolayer of monodisperse droplets as shown in FIG. 4A was illuminated with collimated white light and photographed at several different angles to demonstrate variation in reflected color. Scale, 2 cm; (FIG. 4C) Microscopically, each droplet from FIG. 4B reflects the same color, irrespective of the location of neighboring drops. The color always emanates from near the three-component contact line of the droplets. Scale, 100 µm; (FIG. 4D) Polydisperse droplets all having the same morphology and composition as in FIG. 4A but varying size show different colors in reflection. Scale, 100 µm; (FIG. 4E) Macroscopically, the polydisperse droplets in FIG. 4D reflect glittery white light. Scale, 2 cm. f, Reflection optical micrograph of solid particles dispersed in water of the same general morphology as shown in FIG. 4A. Trimethyloylpropane triacrylate (n≈1.56) was used in place of heptane, Sartomer fluorinated oligomer (n≈1.33) mixed with 1H,1H,2H,2H-perfluorodecyl acrylate (n≈1.34) replaced perfluorohexane, and the monomers were polymerized by UV initiation. The particles did not orient as uniformly as the liquid droplets, highlighting the importance of the orientation of the hydrocarbon-fluorocarbon interface to enabling reflection. Scale, 100 µm; (FIG. 4G) Reflectance photograph showing the image created when water condensed onto a polystyrene petri dish with patterned surface hydrophobicity in the shape of an elephant. UV-ozone treated hydrophilic regions appear black because they do not reflect light, while the hydrophobic regions (advancing contact angle, CA≈70°) reflected color. Scale, 3 cm; (FIG. 4H), Reflectance optical micrograph of water droplets condensed onto hydrophobic polydimethylsiloxane (CA≈90°) (Scale, 50 µm);

FIG. 5A, Side and top view schematics of the experimental setup and coordinate system used to visualize the iridescent color reflected from the droplets in three dimensions. A translucent hemispherical dome (which was a half ping-pong ball) was placed over a petri dish containing monodisperse droplets. Collimated white light from an LED was introduced through a 3 mm hole cut into the side of the domed screen. Colors reflected from the drops projected onto the internal surface of the dome screen; FIG. 5B, Side view photograph of an exemplary iridescence pattern (scale, 5 mm) with an inset showing the shape of droplets used (scale, 50 µm). Below: the dome was removed and the droplets were photographed at different viewing angles under the same illumination angle to demonstrate correlation of the macroscopic colors with the mapped angular position of color onto the screen. Scale, 2 mm; FIG. 5C, The iridescence of monodisperse droplets with varying diameter but consistent morphology was investigated. Top row: optical micrographs of a droplet from each sample. Scale, 100 µm. Middle row: photographs of the iridescence pattern as viewed from θ=0° with an illumination angle of θ=35°. Bottom row: photographs of the iridescence pattern as viewed from the side; Scale, 1 cm. FIG. 5D, Effect of illumination angle on the reflected colors for a given droplet geometry and size. Far left, optical micrograph of an example droplet. Scale, 50 µm. Photographs of the iridescence pattern as viewed from θ=0° with an illumination angle of θ=35° are shown, scale 1 cm.; FIG. 5E, Effect of oil-oil interfacial curvature on the iridescence. Top row: optical micrographs of example droplets. Scale, 50 µm. Bottom row: photographs of the iridescence pattern as viewed from θ=0° with an illumination angle of θ=35°, scale 1 cm. Janus droplets with no internal curvature (far left) and double emulsions (far right) did not display any reflected color when illuminated from above;

FIG. 6A, scanning electron micrograph of the cylindrical segments fabricated with multiphoton lithography; FIG. 6B, optical micrographs of polymer cylinder segments in focus and defocused by 100 µm, 130 µm, and 230 µm, showing how the reflected color patterns evolve farther from the surface; FIG. 6C, Diagram of cylinders with 70°, the contact angle, defined; FIG. 6D, Diagram of three rays taking different trajectories along the concave interface that interfere causing the observed coloration. The input and output angles ($θ_{in}$, $θ_{out}$) are measured from the global sample surface normal to the left ($θ_{out}$ is negative as shown); FIG. 6E, Spectrum derived from Equation 5 for ($θ_{in}$, $θ_{out}$)=(0°, −13.09°) (corresponding to 0° input, −20° output in air). The inset shows the coordinates of this spectrum in the CIE color space; FIG. 6F, Color distribution from the cylinders illuminated at normal incidence. Lines of constant θ are shown, scale 2 cm; FIG. 6G, Comparison of color distribution from model and experiment for 0° illuminations of the 70° contact angle cylinders. The brightness of the experimental dataset was increased multiplied by a factor of (1−0.8 cos θ) in order to better see the colors at large angles;

FIG. 7A, diagram of a light path in a 3D spherical cap. Light is confined to the plane through the center of curvature of the interface and the line defined by the incoming light ray direction. Within this plane, the system can be reduced to two dimensions with effective opening angle $η_{eff}$, and effective input and output angles $β_{in}$ and $β_{out}$; FIGS. 7B-7E, show the color distribution as a function of $θ_{out}$ when changing: FIG. 7B, the radius of curvature, FIG. 7C, the illumination direction within the medium with refractive index $n_1$, FIG. 7D, the opening angle η, and FIG. 7E, the refractive index of the fluorocarbon component, $n_2$. The default parameters used were R=25 µm, η=71, $θ_{in}$=21.41°, $n_1$=1.37, and $n_2$=1.27, and one parameter was varied from these at a time; FIGS. 7F-7G, comparison of experimental iridescence maps of index matched Janus droplets with the predicted 3D calculation for various: FIG. 7F, sizes (radii of curvature. The contact angle and illumination were fixed at, η=71° and $θ_L$=30°; FIG. 7G, angles of illumination (same droplet sample as h(ii)), and FIG. 7H, droplet morphologies ($θ_L$=30°). Droplet scale 50 µm.

FIG. 9A shows a schematic of a concave geometry that can generate interference from multiple total internal reflections; FIG. 9B shows a fabrication method of monodisperse microwells and domes. i. A thin layer of uncured NOA 71 was pipetted into a petri dish. On top of this, an aqueous surfactant solution containing monodisperse glass particles was added. The sample is cured, leaving the particles embedded partially. This sample, in which the particles are partially embedded in the polymer, can show structural color from TIR on its own, or, the structure can be replicated into wells. (ii). The particles can then be replicated in PDMS (iii) to form wells or further replicated to produce polymer domes (iv); FIG. 9C shows a SEM image of PDMS wells formed from 40-43 µm silica particles embedded in NOA 71 originally in an aqueous solution of 1 mM CTAB and 20 v/v % isopropyl alcohol. Scale, 50 µm; FIG. 9D shows a profilometry image of the PDMS wells. Scale, 20 µm; FIG. 9E shows DSLR photographs of replicated wells and domes. i, PDMS wells were filled with the high index oil benzyl benzoate (n=1.57). These wells were then replicated into domes that were backed with air (ii), and water (iii). Light angle, 40°. Camera angle=50°. Scale, 5 mm; FIG. 9F shows a schematic of iridescent color captured on a translucent dome. DLSR photo of projected color onto the translucent dome from PDMS wells filled with benzyl benzoate. Light angle=40°, camera angle=0°. Scale, 1 cm;

FIG. 10A shows varying the contact angle of the microdomes and wells with the addition of isopropyl alcohol (from left to right: 0 v/v %, 10 v/v %, and 20 v/v %) in the aqueous 1 mM CTAB surfactant solution. Middle row: profilometry images of PDMS wells replicated from resulting variation in isopropyl alcohol concentrations in the aqueous 1 mM surfactant solution with 40-43 µm diameter particles show how the depth of the particles affects the contact angle of the replicated PDMS wells. Scale, 20 µm. Bottom row: DLSR images of the projected color onto the translucent hemisphere. As the depth of the wells decrease, the color bands vary in position. Light angle=35°, camera angle=0°. Scale, 1 cm; FIG. 10B shows varying the diameter of monodisperse glass particles (29-32 µm, 40-43 µm and 98-102 µm diameter) at the interface of NOA 71 in an aqueous surfactant solution of 1 mM CTAB and 20 v/v % isopropyl alcohol. Middle row: profilometry images of PDMS wells replicated from each size of glass particle. Scale 20 µm. While the contact angle of the glass with respect to the water-monomer interface does not change, the size and the depth of the wells do vary. Bottom row: DLSR photographs of the projected color onto the translucent hemisphere. As the size and depth of the wells increase, the color bands change in size. Light angle=40°, camera angle=0°. Scale, 1 cm;

FIG. 11A shows a DSLR image of a solid film of PDMS wells formed from 40-43 µm diameter silica particles embedded in NOA 71 originally in an aqueous solution of 1 mM CTAB and 20 v/v % isopropyl alcohol filled with a high index UV curable elastomer (Dowsil VE-6001, n=1.53). This allows for a stretchable film of structural color that can be mechanically deformed to alter resulting color pattern. The resulting color of these wells from a 50° light angle with a 50° viewing angle were imaged as the film was stretched in a y direction (left column), unstretched (middle column), and stretched in an x direction (right column) with respect to the incident light (scale, 1 cm). Yellow arrows show the direction of stretching with respect to the light with their corresponding brightfield transmission optical images shown (bottom row, scale 50 µm); FIG. 11B shows DSLR images of stretching domes replicated in the polymer OG 142-87 from PDMS submerged in water. Replicated domes were cured from PDMS wells that were unstretched and while being stretched in a y direction and x direction, displayed by their projected color pattern for a light angle of 0° and 50° (c). Scale, 1 cm.

FIG. 12A shows the refractive index difference between the two media at the concave interface can affect the critical angle of total internal reflection of the incident light. PDMS wells formed from 40-43 µm silica particles embedded in NOA 71 originally in an aqueous solution of 1 mM CTAB and 20 v/v % isopropyl alcohol were filled with various mixtures of tetrabromoethane (n=1.64), benzyl benzoate (n=1.57) and n-decane (n=1.42); FIG. 12B depicts the wells of PDMS selectively filled to create an image. Light angle=60°, camera angle=50°. Scale, 1 cm; FIG. 12C shows the PDMS wells instead filled with liquid crystal 5CB heated past its nematic to isotropic transition temperature. At room temperature, the 5CB filled PDMS wells interfere with the color from the nematic 5CB. As the PDMS wells filled with 5CB are heated, the liquid crystal no longer has surface alignment and becomes isotropic and the color changes; FIG. 12D shows iridescent color can be switched on and off using temperature to vary the index of the oils backing the domes. Domes of OG 142-87 (n=1.50) replicated from the PDMS wells backed with a low index fluorocarbon, 2-(trifluoromethyl)-3-ethoxydodecafluorohexane (n=1.33) onto which an immiscible layer of higher index hydrocarbon (5:1 toluene to benzyl benzoate, n=1.50) is added. The sample is heated until the hydrocarbon and fluorocarbon mix, raising the overall index of the oils backing the domes (n=1.44).

(FIG. 14B) Diagram showing the two directions of propagation along the interface, with the same input and output angles, according to one set of embodiments.

Figure 1A:
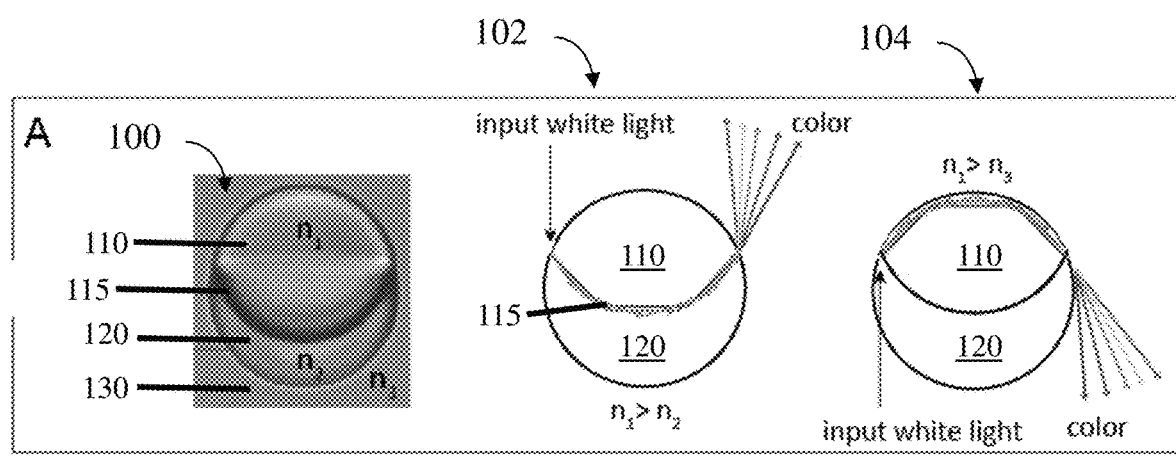
FIG. 1A shows an exemplary article comprising two or more components and an interface for generation of total internal reflection (TIR), according to some embodiments.
Figures 2A, 2B, 2C, 2D, 2E, 2F:
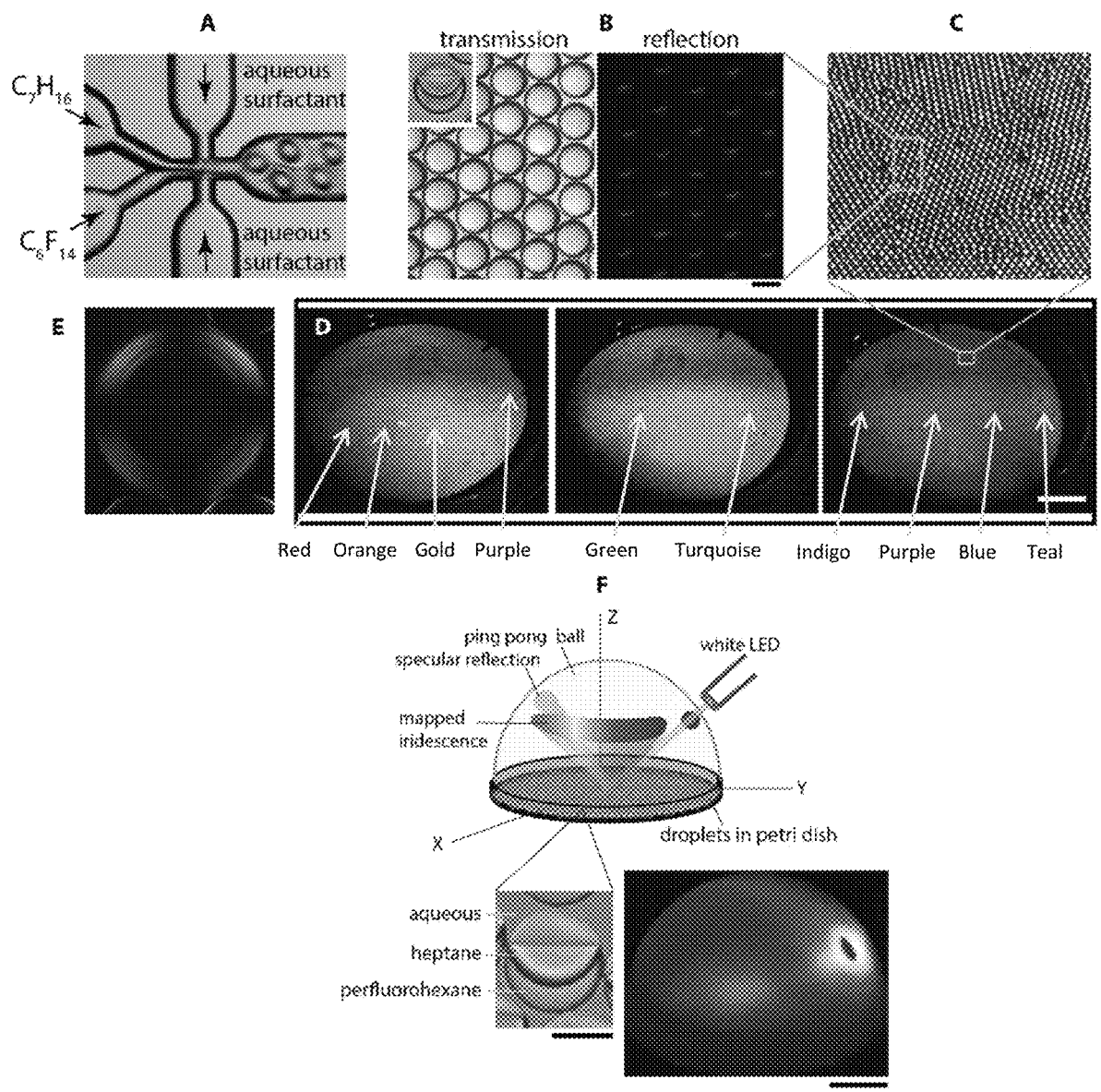
FIGS. 2A-2F show (FIG. 2A) droplets fabricated in a microfluidic flow-focusing device. Capstone FS-30 fluorosurfactant and Triton X-100 at varying concentrations are used tune the droplet shape.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Embodiments described herein may be useful for generation of tunable electromagnetic radiation such as coloration (e.g., iridescence, structural color) and/or interference patterns from, for example, surfaces (e.g., comprising a plurality of microdomes and/or microwells), emulsion droplets and/or particles. In some embodiments, the surfaces, droplets, and/or particles produce visible color (e.g., structural color) without the need for dyes. Such colors may be generated in articles wherein the morphology of the droplets, particles, or surfaces can be controlled dynamically, or the refractive index contrast at the interfaces where TIR occurs can be controlled dynamically, which may permit the tunability of the perceived spectrum throughout the visible, infrared, UV, microwave, regions, etc. (e.g., containing wavelengths of 1 nanometer to 1 centimeter). In some embodiments, the droplet or surface morphology may be fixed such that the droplet or surface obtains a permanent color (or array of colors) or interference pattern. In some cases, liquids, gasses, and/or solids derived thereof may be used to generate structural coloration using curved and/or polygonal material interfaces e.g., that create spectral separation by interference effects occurring due to, for example, cascaded internal reflection of light at the interface. In some embodiments, the droplets and/or particles or surfaces described herein comprise an interface (e.g., an interface between two or more components where total internal reflection can occur) and a geometry in which multiple total internal reflection can occur. Without wishing to be bound by theory, electromagnetic radiation travelling along different trajectories of total internal reflection at an interface may, in some cases, interfere, generating color, and/or generating interference effects such as interference patterns. In some embodiments, a first portion of the electromagnetic radiation may undergo total internal reflection and a second portion of the electromagnetic radiation is reflected (e.g., by a mechanism different that total internal reflection). In some embodiments, substantially all electromagnetic radiation incident to the interface undergoes total internal reflection.

In certain embodiments, the structural color may be tuned by changing the curvature or angles of sides, the radius of curvature (e.g., of the interface), and/or the refractive index of one or more components at the interface. Non-limiting examples of suitable interfaces for generating tunable coloration include liquid-liquid interfaces (e.g. within a droplet), liquid-gas interfaces (e.g. a wetted droplet in air), solid-solid interfaces (e.g. within a particle), solid-gas interfaces (e.g. a solid structure in air), and solid-liquid interfaces (e.g. solid structure submerged in water).

Unlike the precise nanoscale periodicity generally required to create structural color from diffraction gratings, photonic crystals, or multilayers, the optical interference created by multiple total internal reflection as described herein may, in some embodiments, advantageously be generated at concave interfaces with dimensions on the microns scale (e.g., having a characteristic dimension of greater than or equal to 1 micron and less than or equal to 1000 microns, greater than or equal to 1 micron and less than or equal to 100 microns, greater than or equal to 10 microns and less than or equal to 100 microns).

The terms "iridescent" and "iridescence" as used herein are each given its ordinary meaning in the art and generally refer to color that changes as a function of light incidence and/or viewing angle.

Without wishing to be bound by theory, generation of tunable coloration, patterns of coloration, or interference patterns may be due to interference phenomena occurring when light undergoes multiple total internal reflections at curved, microscale, nanoscale, or macroscale interfaces (e.g., on a surface between two or more components). Such tunable coloration or interference patterns may be implemented in a variety of materials and systems including simple sessile water drops, multicomponent droplets, 3D patterned surfaces, and solid micro-particles, without the need for precise control of nanoscale periodicity and may be useful in a wide range of applications including inks, paints, cosmetics, personal care products, displays, sensors (e.g., colorimetric sensors for chemical and/or physical parameters such as heat, presence of an analyte (e.g., chemical, biological component), pressure, mechanical deformation, humidity, etc.), binders, displays and signage, point-of-care medical diagnostics, coatings, as well as for fundamental exploration in fields ranging from optics and photonics to complex fluids and colloids.

The articles, droplets, and methods as described herein offer numerous advantages to such articles known in the art, for producing color or optical interference in a system. For example, the droplets, articles, surfaces, and methods described herein may, in some cases, produce structural color (e.g., more brilliant and longer lasting compared to dyes), produce tunable color (e.g., such that small changes in the shape of the droplet or particle can be used to alter the color which is useful for, for example, sensors and displays), do not require nanoscale particles and/or chemical fluorophores and/or pigments, provide structural color entirely from fluids, provide a colorimetic readout (e.g., for responsive droplet sensors), generate color in reflection, generate an optical interference pattern, and/or use only environmental light as the light source.

In some embodiments, the color generated in the article (e.g., droplets, particles, wells, domes) is due, at least in part, to total internal reflection of electromagnetic radiation. For example, light entering the article may be refracted at an interface between a first component and a second component, immiscible with the first component. In some embodiments, such refraction causes an initial color separation (e.g., due to optical dispersion). In certain embodiments, during and/or after refraction, light propagates between the first component and the second component, and/or propagates between the second component and a third component, via total internal reflection. The term "total internal reflection" as used herein is given its ordinary meaning in the art and generally refers to a phenomenon in which a propagated wave (e.g., of electromagnetic radiation) strikes a boundary surface such that, if the refractive index of the medium (e.g., component) is lower on the other side of the boundary surface and the incident angle is greater than a critical angle above which total internal reflection occurs, the wave generally cannot pass through and is entirely reflected. Unless indicated otherwise, the term "refractive index" as used herein is generally given its ordinary meaning in the art and refers to the refractive index measured at a specific wavelength of light undergoing total internal reflection and at the temperature of operation. In some cases, as described herein, total internal reflection occurs at an interface between a first component and a second component (e.g., of a droplet, of a particle, of an emulsion, of a surface, of an interface). In some embodiments, dispersion inside a droplet, for example, may result in different critical angles. In certain embodiments, rays of different spectral composition take different paths along the interface, resulting in varying exit angles of the electromagnetic radiation. In some cases, the presence of dyes and/or pigments in the article may result in absorption and/or reflection of at least a portion of the electromagnetic radiation (e.g., a particular wavelength or range of wavelengths of electromagnetic radiation).

For example, referring to FIG. 1A, in some embodiments droplet 100 comprises first component 110, second component 120 adjacent first component 110, and interface 115 between first component 110 and second component 120. As used herein, when a component is referred to as being "adjacent" another component, it can be directly adjacent to the other component, or one or more intervening layers (e.g., layers including, but not limited to, a third component, a polymer layer, a glass layer, a coating, and/or a fluid) also may be present. A component that is "directly adjacent" another component means that no intervening layer is present.

In some embodiments, the first component comprises a first material (e.g., a liquid such as a fluorocarbon or a hydrocarbon, a solid such as a polymer, a gas) and the second component comprises a second material, different than the first material in type, opacity, reflective index, phase, and/or structure.

In some embodiments, the first component and the second component may be immiscible. Immiscible, as used herein, refers to two components (or a component and a component) having an interfacial tension of greater than or equal to 0.01 mN/m as determined by a spinning drop tensiometer. By contrast, miscible refers to two components (or a component and a component) having an interfacial tension of less than 0.01 mN/m as determined by a spinning drop tensiometer.

In some embodiments, an optional outer component 130 is present. While FIG. 1A illustrates a droplet dispersed in an outer component, those of ordinary skill in the art would understand based upon the teachings of this specification that total internal reflection may occur at any interface between two components including, for example, between the first component and the second component (e.g., droplet 102), between the first component and the outer component (e.g., droplet 104), between the second component and the outer component (not shown), between a third component and a fourth component (not shown), etc. As illustrated in FIG. 1A, input white light (or any other electromagnetic radiation) incident to interface 115 may undergo total internal reflection (e.g., resulting in spectral color generation or interference).

In some embodiments, the article comprises a Janus droplet(s) (e.g., a plurality of Janus droplets). Janus droplets are generally droplets where the droplet is divided into two or more distinct parts comprising two or more different components that do not encapsulate each other. For example, in some embodiments, the article comprises an aqueous component and a plurality of droplets comprising a hydrocarbon and a fluorocarbon, wherein the plurality of droplets are Janus droplets.

In some embodiments, the article comprises a first component and a second component adjacent the first component and an interface between the first component and the second component, the interface configured such that at least a portion of electromagnetic radiation incident to a surface of the interface undergoes total internal reflection between the first component and the second component. In certain embodiments, the first component has a first refractive index greater than a second refractive index of the second component, as described in more detail below.

Figure 8A:
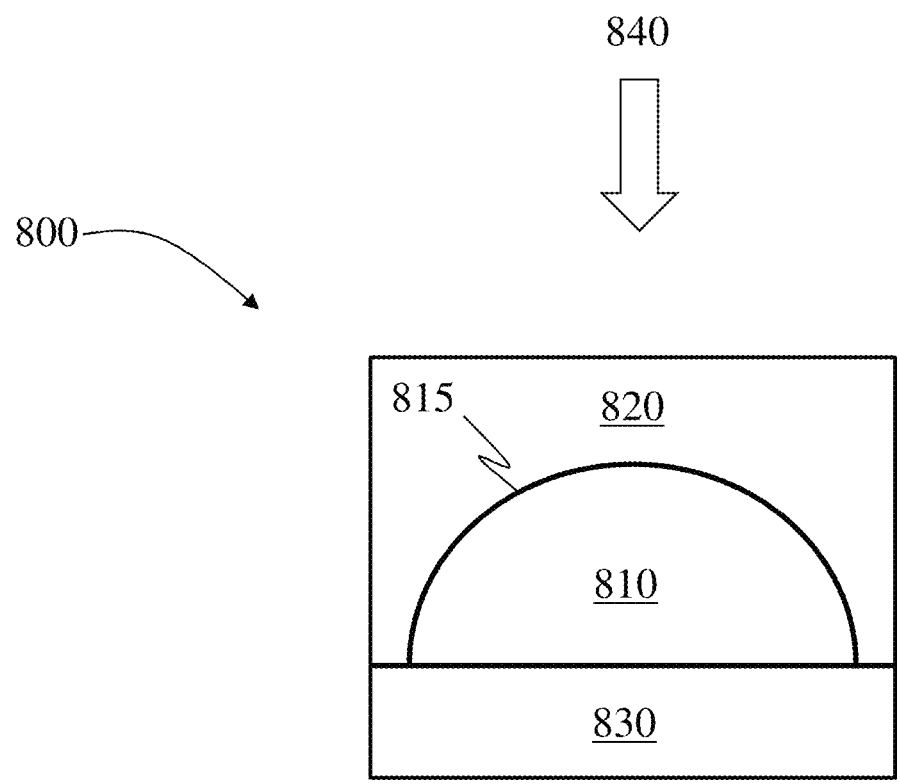
FIGS. 8A-8B are schematic drawings of an article comprising (FIG. 8A) domes or (FIG. 8B) wells, configured to produce tunable coloration, according to one set of embodiments.
Figure 8B:
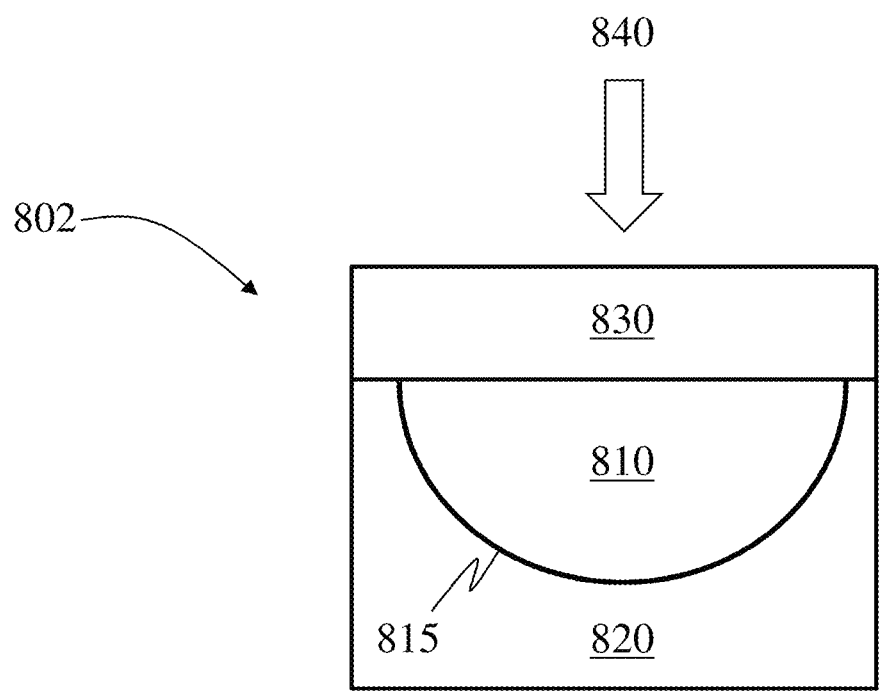

For example, as illustrated in FIGS. 8A-8B, the article may comprise a first component and a second component such that a curved surface is present between the first component and the second component. FIG. 8A illustrates a non-limiting embodiment of article 800 comprising first component 810 and second component 820 adjacent first component 810. In some embodiments, interface 815 between first component 810 and second component 820 is curved (e.g., a curved surface). In some embodiments, interface 815 is convex relative to incident electromagnetic radiation 840. For example, in some embodiments, article 800 comprises one or more wells (e.g., microwells) present at the interface between first component 810 and second component 820. In some embodiments, option third component 830 is present and adjacent first component 810. In some such embodiments, the refractive index of the first component and the refractive index of the second component is selected such that at least a portion of electromagnetic radiation incident to the interface between the first component and the second component undergoes total internal reflection at the interface.

While much of the description herein describes the interface between curved surfaces, those of ordinary skill in the art would understand, based upon the teachings of this specification, that the term 'curved' shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter.

Figure 13:
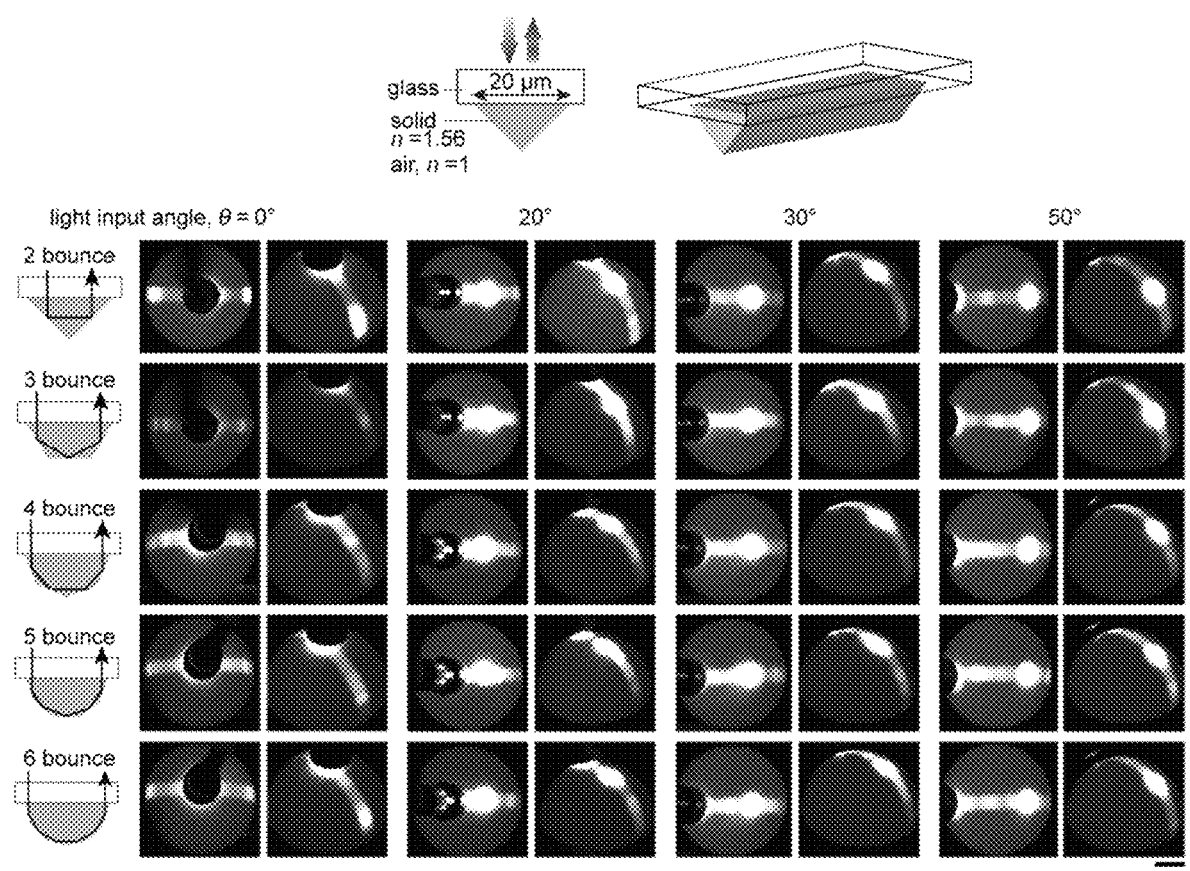
FIG. 13 shows flat-sided polygonal segments printed with multiphoton lithography display iridescence, according to one set of embodiments. The number of sides in the polygon is generally correlated the maximum possible number of total internal reflections (diagram at left) that light can undergo for a given illumination angle. Shown are Canon EOS Rebel T6 DSLR photographs of the reflected color distributions produced by the method described in FIG. 2a. The light input direction is provided as θ and the dome was photographed from two viewing angles. Each polygon had a base width of 20 µm. Scale bar, 1 cm.

In some embodiments, the interface may comprise a plurality of flat surfaces (e.g., a polygonal interface). For example, in some embodiments, the curved surface comprises a plurality of sides (see e.g., FIG. 13). In some embodiments, the curved surface comprises two sides, three sides, four sides, five sides, six sides, seven sides, eight sides, nine sides, ten sides, or more. In some embodiments, at least a portion of the interface may be substantially flat.

In some embodiments, the article comprises a concave surface (e.g., at the interface between the first component and the second component) relative to the incident electromagnetic radiation. For example, as illustrated in FIG. 8B, article 802 comprises first component 810 and second component 820 adjacent first component 810. In some embodiments, interface 815 is concave relative to incident electromagnetic radiation 840. For example, in some embodiments, article 802 comprises one or more domes present at the interface between first component 810 and second component 820. In some embodiments, optional third component 830 is present and adjacent first component 810. In some such embodiments, the refractive index of the first component and the refractive index of the second component is selected such that at least a portion of electromagnetic radiation incident to the interface between the first component and the second component undergoes total internal reflection at the interface.

In certain embodiments, the color or interference can be generated from either liquid drops, solid particles, solid films, gels, gases, polymers, or combinations thereof. In an exemplary embodiment, the first component comprises a hydrocarbon (e.g., heptane) and the second component comprises a fluorocarbon (e.g., perfluorohexane). In another exemplary embodiment, the outer component is an aqueous outer component. In yet another exemplary embodiment, the first component comprises oil and the second component comprises a polymer (e.g., polydimethylsiloxane). In another exemplary embodiments, the first component comprises polydimethylsiloxane and the second component comprises oil. In some cases, the first component or the second component may comprise air. Other configurations are also possible.

The term component, as used herein, generally refers to a portion of an article (e.g., a droplet, microwells, domes) comprising a group of substantially similar molecules, a group of substantially similar compounds, and/or a phase of matter (e.g., a non-aqueous phase, an aqueous phase) comprising such molecules and/or compounds. Those skilled in the art would understand that the term component is not intended to refer to a single molecule or atom. In some embodiments, a component is a liquid phase (e.g., a gas phase, an aqueous phase, non-aqueous phase) comprising a group of substantially similar compounds and/or molecules. In some embodiments, a component is a solid phase (e.g., a polymer, glass). In some embodiments, a component is a gel. For example, in some cases, each component may occupy at least about 1 vol %, at least about 2 vol %, at least about 5 vol %, at least about 10 vol %, at least about 20 vol %, at least about 50 vol %, at least about 70 vol %, at least about 90 vol %, at least about 95 vol %, or at least about 99 vol % of the total volume of the two or more components.

In some embodiments, the first component is present in each article in an amount greater than or equal to 10 vol %, greater than or equal to 15 vol %, greater than or equal to 20 vol %, greater than or equal to 25 vol %, greater than or equal to 30 vol %, greater than or equal to 35 vol %, greater than or equal to 40 vol %, greater than or equal to 45 vol %, greater than or equal to 50 vol %, greater than or equal to 55 vol %, greater than or equal to 60 vol %, greater than or equal to 65 vol %, greater than or equal to 70 vol %, greater than or equal to 75 vol %, greater than or equal to 80 vol %, or greater than or equal to 85 vol % on average versus the total volume of all components within each droplet.

In certain embodiments, the first component is present in each article in an amount less than or equal to 90 vol %, less than or equal to 85 vol %, less than or equal to 80 vol %, less than or equal to 75 vol %, less than or equal to 70 vol %, less than or equal to 65 vol %, less than or equal to 60 vol %, less than or equal to 55 vol %, less than or equal to 50 vol %, less than or equal to 45 vol %, less than or equal to 40 vol %, less than or equal to 35 vol %, less than or equal to 30 vol %, less than or equal to 25 vol %, less than or equal to 20 vol %, or less than or equal to 15 vol % on average versus the total volume of all components within each droplet. Combinations of the above-referenced ranges are also possible (e.g., greater than or equal to 10 vol % and less than or equal to 90 vol %, greater than or equal to 35 vol % and less than or equal to 65 vol %, greater than or equal to 45 vol % and less than or equal to 55 vol %). Other ranges are also possible.

In certain embodiments, the second component is present in each article in an amount greater than or equal to 10 vol %, greater than or equal to 15 vol %, greater than or equal to 20 vol %, greater than or equal to 25 vol %, greater than or equal to 30 vol %, greater than or equal to 35 vol %, greater than or equal to 40 vol %, greater than or equal to 45 vol %, greater than or equal to 50 vol %, greater than or equal to 55 vol %, greater than or equal to 60 vol %, greater than or equal to 65 vol %, greater than or equal to 70 vol %, greater than or equal to 75 vol %, greater than or equal to 80 vol %, or greater than or equal to 85 vol % on average versus the total volume of all components within each article. In some embodiments, the second component is present in each article in an amount less than or equal to 90 vol %, less than or equal to 85 vol %, less than or equal to 80 vol %, less than or equal to 75 vol %, less than or equal to 70 vol %, less than or equal to 65 vol %, less than or equal to 60 vol %, less than or equal to 55 vol %, less than or equal to 50 vol %, less than or equal to 45 vol %, less than or equal to 40 vol %, less than or equal to 35 vol %, less than or equal to 30 vol %, less than or equal to 25 vol %, less than or equal to 20 vol %, or less than or equal to 15 vol % on average versus the total volume of all components within each article. Combinations of the above-referenced ranges are also possible (e.g., greater than or equal to 10 vol % and less than or equal to 90 vol %, greater than or equal to 35 vol % and less than or equal to 65 vol %, greater than or equal to 45 vol % and less than or equal to 55 vol %). Other ranges are also possible.

In certain embodiments, the article comprises two or more components, each having a particular refractive index. For example, in some embodiments, the refractive index of the first component may be different (e.g., greater than) than the refractive index of the second component. Suitable materials for the components of the articles are described in more detail below. Those of ordinary skill in the art would be capable of selecting components with suitable refractive indices based upon the teachings of this specification.

In some cases, the article comprises two or more components, each having a particular refractive index. In some instances, a certain component may have a refractive index greater than the refractive index of a different components. Those of ordinary skill in the art will be capable of selecting components with suitable refractive indices for generating desired coloration based upon the teachings of this specification. In some embodiments, the refractive index (measured at 20° C. at the wavelength of electromagnetic radiation undergoing total internal reflection) of the first component may be greater than or equal to 1, greater than or equal to 1.1, greater than or equal to 1.2, greater than or equal to 1.25, greater than or equal to 1.3, greater than or equal to 1.35, greater than or equal to 1.4, greater than or equal to 1.45, greater than or equal to 1.5, greater than or equal to 1.55, greater than or equal to 1.6, greater than or equal to 1.7, greater than or equal to 1.8, greater than or equal to 1.9, greater than or equal to 2, greater than or equal to 2.1, greater than or equal to 2.2, greater than or equal to 2.3, greater than or equal to 2.4. In certain embodiments, the refractive index of the first component may be less than or equal to 2.5, less than or equal to 2.4, less than or equal to 2.3, less than or equal to 2.2, less than or equal to 2.1, less than or equal to 2, less than or equal to 1.9, less than or equal to 1.8, less than or equal to 1.7, less than or equal to 1.6, less than or equal to 1.55, less than or equal to 1.5, less than or equal to 1.45, less than or equal to 1.4, less than or equal to 1.35, less than or equal to 1.3, less than or equal to 1.25, less than or equal to 1.2, or less than or equal to 1.1. Combinations of the above referenced ranges are also possible (e.g., greater than or equal to 1 and less than or equal to 1.6, greater than or equal to 1.2 and less than or equal to 1.6, greater than or equal to 1.25 and less than or equal to 1.4, greater than or equal to 1.2 and less than or equal to 1.3). Other ranges are also possible.

In some embodiments, the refractive index (measured at 20° C. at the wavelength of electromagnetic radiation undergoing total internal reflection) of the second component may be greater than or equal to 1.0, greater than or equal to 1.1, 1.2, greater than or equal to 1.25, greater than or equal to 1.3, greater than or equal to 1.35, greater than or equal to 1.4, greater than or equal to 1.45, greater than or equal to 1.5, or greater than or equal to 1.55, greater than or equal to 1.6, greater than or equal to 1.7, greater than or equal to 1.8, greater than or equal to 1.9, greater than or equal to 2, greater than or equal to 2.1, greater than or equal to 2.2, greater than or equal to 2.3, greater than or equal to 2.4. In certain embodiments, the refractive index of the first component may be less than or equal to 2.5, less than or equal to 2.4, less than or equal to 2.3, less than or equal to 2.2, less than or equal to 2.1, less than or equal to 2, less than or equal to 1.9, less than or equal to 1.8, less than or equal to 1.7, less than or equal to 1.6, less than or equal to 1.55, less than or equal to 1.5, less than or equal to 1.45, less than or equal to 1.4, less than or equal to 1.35, less than or equal to 1.3, less than or equal to 1.25, less than or equal to 1.2, or less than or equal to 1.1. Combinations of the above referenced ranges are also possible (e.g., greater than or equal to 1 and less than or equal to 1.6, greater than or equal to 1.2 and less than or equal to 1.6, greater than or equal to 1.25 and less than or equal to 1.4, greater than or equal to 1.3 and less than or equal to 1.4). Other ranges are also possible. Those of ordinary skill in the art would be capable of selecting suitable methods for determining the refractive index of a component, based upon the teachings of this specification, and as described above.

In certain embodiments, a magnitude of a difference in refractive index between the refractive index of the first component and the refractive index of the second component may be greater than or equal to 0.05, greater than or equal to 0.1, greater than or equal to 0.15, or greater than or equal to 0.2. In some embodiments, the magnitude of the difference in refractive index between the refractive index of the first component and the refractive index of the second component may be less than or equal to 0.25, less than or equal to 0.2, less than or equal to 0.15, or less than or equal to 0.1. Combinations of the above-referenced ranges are also possible (e.g., greater than or equal to 0.05 and less than or equal to 0.25). Other ranges are also possible.

While exemplary configurations for droplets and/or articles having two or more components, are described above, those skilled in the art would understand based upon the teaching of this specification that additional reconfigurations and rearrangements are also possible (e.g., the third component encapsulating the first and second components, etc.). Those skilled in the art would also understand, based upon the teachings of this specification, that droplets and/or articles comprising four or more, five or more, or six or more components are also possible and that interfaces between any two of the components may undergo total internal reflection.

In some embodiments, the article comprises an outer component and a plurality of droplets is adjacent a substrate. As used herein, when an article is referred to as being "adjacent" a substrate, it can be directly adjacent to the substrate, or one or more intervening components (e.g., layers including, but not limited to, a polymer layer, a glass layer, a coating, and/or a fluid) also may be present. An article that is "directly adjacent" a substrate means that no intervening component is present.

In some embodiments, the article may be stimulated (e.g., by a first stimulus such as a change in temperature or exposure to an analyte) such that the color emitted or interference from the article (e.g., droplets) is changed as compared to the color or interference emitted prior to stimulation. For example, in some embodiments, the radius of curvature of the interface between the first component and the second component may change upon stimulation. Those skilled in the art would understand that changes in radius of curvature as described herein does not refer to the motion of immiscible components in an article (e.g., droplet) due to regular fluid motion driven by passive diffusion and/or Brownian motion, but instead refer to the controlled change in the configuration of the component as a result of the addition of a particular stimulus or condition not present prior to the change in configuration of the components (or removal of a particular stimulus or condition, present prior to the change in configuration of the components). In some cases, a change in temperature may increase the passive diffusion and/or Brownian motion of components present in the article (e.g., droplet) but does not result in a change in configuration (e.g., radius of curvature between two components) of the components as described herein (e.g., until exposed to a stimulus). In other embodiments, the radius of curvature between two components may change upon stimulation (e.g., by change in temperature), as described herein.

In certain embodiments, as described herein, the article may be exposed to a source of electromagnetic radiation (e.g., visible light), such that at least a portion of the electromagnetic radiation (e.g., a particular wavelength or range of wavelengths) undergoes total internal reflection. In some cases, at least a portion of the electromagnetic radiation may be reflected off of at least a surface (e.g., a surface of the first component, a surface of the second component, a surface of the interface between the first component and the second component) of the article. The electromagnetic radiation (e.g., light) may comprise any suitable wavelength, including but not limited to radio waves (e.g., a wavelength between about 1 cm and about 100 m), infrared light (e.g., a wavelength between about 700 nm and about 1 cm), visible light (e.g., a wavelength between about 400 nm and about 700 nm), ultraviolet (UV) light (e.g., a wavelength between about 10 nm and about 400 nm), x-rays (e.g., a wavelength between about 0.01 nm and about 10 nm), and combinations thereof. In some embodiments, the article may be exposed to a single wavelength of light (e.g., monochromatic). In some such embodiments, the electromagnetic radiation reflecting off of the interface may produce an interference pattern e.g., comprising a single wavelength. In certain embodiments, the article may be exposed to multiple and/or a range of wavelengths of electromagnetic radiation. In some such embodiments, at least a portion of the electromagnetic radiation may constructively or destructively interfere.

Figures 3A, 3B, 3C:
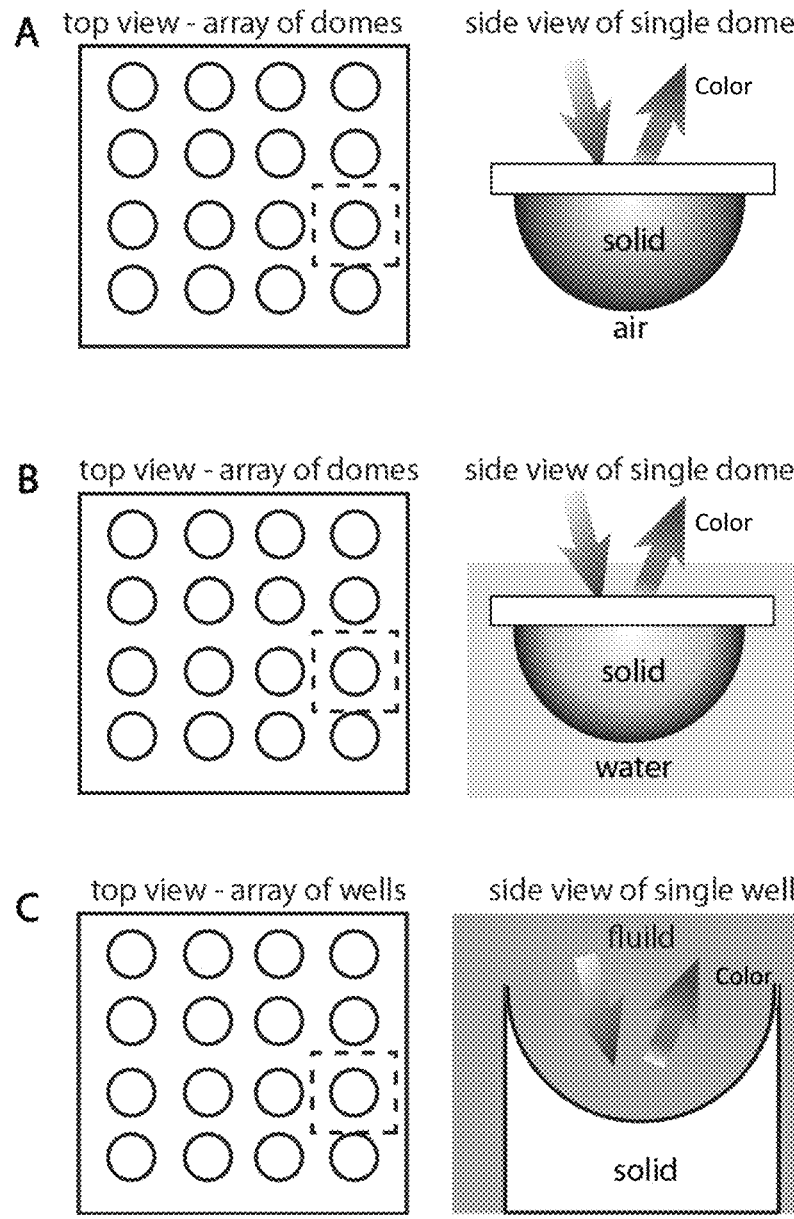
FIGS. 3A-3C show (FIG. 3A) a schematic of array of solid domes in a grid pattern.

As described above and herein, droplets, wells, and/or domes of the article may be arranged in a two-dimensional or three-dimensional array (e.g., as illustrated in FIGS. 3A-3C). The phrase "two-dimensional array" is given its ordinary meaning in the art and generally refers to the ordered arrangement of objects (e.g., droplets, domes, wells) in e.g., ordered rows and columns in a two-dimensional plane comprising said objects. The phrase "three-dimensional array" is given its ordinary meaning in the art and generally refers to the ordered arrangement of objects (e.g., droplets, domes, wells) in e.g., ordered rows, columns, and slices (or planes) in a three-dimensional space. The arrangement of the droplets, wells, and/or domes may be positioned in a disordered array.

In some embodiments, the droplets, wells, and/or domes of the article may be randomly distributed (e.g., on a surface, in an outer phase). Advantageously, in some embodiments, the articles and methods described herein may produce coloration and/or interference without the need for ordered arrangement of the components (e.g., droplets, wells, domes).

In some embodiments, at least 10%, at least 20%, at least 30%, at least 40%, at least 50%, at least 60%, at least 70%, at least 80%, or at least 90% of the droplets in the article are arranged in a regular two-dimensional array. In some embodiments, less than or equal to 100%, less than or equal to 90%, less than or equal to 80%, less than or equal to70%, less than or equal to 60%, less than or equal to 50%, less than or equal to 40%, less than or equal to 30%, or less than or equal to 20% of the droplets in the article are arranged in a regular two-dimensional array. Combinations of the above-referenced ranges are also possible (e.g., at least 10% and less than or equal to 100%). Other ranges are also possible.

In certain embodiments, at least 10%, at least 20%, at least 30%, at least 40%, at least 50%, at least 60%, at least 70%, at least 80%, or at least 90% of the droplets in the article are arranged in a regular three-dimensional array. In some embodiments, less than or equal to 100%, less than or equal to 90%, less than or equal to 80%, less than or equal to70%, less than or equal to 60%, less than or equal to 50%, less than or equal to 40%, less than or equal to 30%, or less than or equal to 20% of the droplets in the article are arranged in a regular three-dimensional array. Combinations of the above-referenced ranges are also possible (e.g., at least 10% and less than or equal to 100%). Other ranges are also possible.

In some embodiments, at least 10%, at least 20%, at least 30%, at least 40%, at least 50%, at least 60%, at least 70%, at least 80%, or at least 90% of the domes in the article are arranged in a regular two-dimensional array. In some embodiments, less than or equal to 100%, less than or equal to 90%, less than or equal to 80%, less than or equal to70%, less than or equal to 60%, less than or equal to 50%, less than or equal to 40%, less than or equal to 30%, or less than or equal to 20% of the domes in the article are arranged in a regular two-dimensional array. Combinations of the above-referenced ranges are also possible (e.g., at least 10% and less than or equal to 100%). Other ranges are also possible.In some embodiments, at least 10%, at least 20%, at least 30%, at least 40%, at least 50%, at least 60%, at least 70%, at least 80%, or at least 90% of the wells (e.g., microwell) in the article are arranged in a regular two-dimensional array. In some embodiments, less than or equal to 100%, less than or equal to 90%, less than or equal to 80%, less than or equal to70%, less than or equal to 60%, less than or equal to 50%, less than or equal to 40%, less than or equal to 30%, or less than or equal to 20% of the wells (e.g., microwell) in the article are arranged in a regular two-dimensional array. Combinations of the above-referenced ranges are also possible (e.g., at least 10% and less than or equal to 100%). Other ranges are also possible.

The plurality of droplets may have a first configuration (e.g., arrangement of two or more components within each droplet, radius of curvature between two or more components within each droplet) under a first set of conditions. For example, in the first configuration, the interface between a first component and a second component may have a first radius of curvature. In certain embodiments, at least a portion of the plurality of droplets has a second configuration, different than the first configuration, under a second set of conditions different than the first set of conditions. In some embodiments, in the second configuration, the interface between the first component and the second component may have a second radius of curvature, different than the first radius of curvature. In some embodiments, changes in the radius of curvature result in different total internal reflection of electromagnetic radiation. For example, the color of a droplet(s) may be changed by stimulating at least a portion of the droplets and exposing the droplets to electromagnetic radiation (e.g., such that the electromagnetic radiation undergoes total internal reflection).

The first set of conditions may include the temperature, pressure, pH, an electric field, a magnetic field, and/or presence or absence of a particular stimulus such that the second set of conditions includes at least a temperature, pressure, pH, an electric field, a magnetic field, and/or presence or absence of a particular stimulus that is different than the first set of conditions. In some embodiments, the second set of conditions has a different temperature than the first set of conditions (e.g., other conditions such as pressure, pH, an electric field, a magnetic field, etc. may or may not be substantially similar). In certain embodiments, the second set of conditions comprises a stimulus that was not present, or was present in a substantially lesser amount, than in the first set of conditions. For example, in some embodiments, the plurality of droplets may have a first configuration and, upon exposure to a stimulus, at least a portion of the droplets obtain a second configuration different than the first configuration.

In some embodiments, the magnitude of the radius of curvature of the interface may increase upon exposure of the droplets to a stimulus. For example, the magnitude of the radius of curvature of the interface in the second configuration may be greater than or equal to 1.1, greater than or equal to 1.5, greater than or equal to 2, greater than or equal to 3, greater than or equal to 5, greater than or equal to 10, greater than or equal to 50, greater than or equal to 100, greater than or equal to 500, greater than or equal to 1000, greater than or equal to 5000, greater than or equal to 10000, or greater than or equal to 100000 times greater than the radius of curvature of the interface in the first configuration. In some embodiments, the magnitude of the radius of curvature of the interface in the second configuration may be less than or equal to 1000000, less than equal to 100000, less than equal to 10000, less than equal to 5000, less than equal to 1000, less than equal to 500, less than equal to 100, less than equal to 50, less than equal to 10, less than equal to 5, less than equal to 3, less than or equal to 2, or less than or equal to 1.5 times greater than the magnitude of the radius of curvature of the interface in the first configuration. Combinations of the above-referenced ranges are possible (e.g., greater than or equal to 1.1 and less than or equal to 1000000 times greater). Other ranges are also possible.

In some embodiments, the magnitude of the radius of curvature of the interface may decrease upon exposure of the droplets to a stimulus. For example, the magnitude of the radius of curvature of the interface in the first configuration may be greater than or equal to 1.1, greater than or equal to 1.5, greater than or equal to 2, greater than or equal to 3, greater than or equal to 5, greater than or equal to 10, greater than or equal to 50, greater than or equal to 100, greater than or equal to 500, greater than or equal to 1000, greater than or equal to 5000, greater than or equal to 10000, or greater than or equal to 100000 times greater than the radius of curvature of the interface in the second configuration. In some embodiments, the magnitude of the radius of curvature of the interface in the first configuration may be less than or equal to 1000000, less than equal to 100000, less than equal to 10000, less than equal to 5000, less than equal to 1000, less than equal to 500, less than equal to 100, less than equal to 50, less than equal to 10, less than equal to 5, less than equal to 3, less than or equal to 2, or less than or equal to 1.5 times greater than the magnitude of the radius of curvature of the interface in the second configuration. Combinations of the above-referenced ranges are possible (e.g., greater than or equal to 1.1 and less than or equal to 1000000 times greater). Other ranges are also possible.

In certain embodiments, the radius of curvature of an interface between a first component and a second component may be greater than 0 in the first configuration and less than 0 in the second configuration.

In some embodiments, the radius of curvature of the interface may be less than 0 in the first configuration and greater than 0 in the second configuration. In some cases, the radius of curvature of the interface may be less than 0 in the first configuration and less than 0 in the second configuration, but different in magnitude than the first configuration. In some embodiments, the radius of curvature of the interface may be greater than 0 in the first configuration and greater than 0 in the second configuration, but different in magnitude than the first configuration.

In some embodiments, the magnitude of an arc length of the interface may increase upon exposure of the droplet to a stimulus. For example, the magnitude of the arc length of the interface in the second configuration may be greater than or equal to 1.1, greater than or equal to 1.5, greater than or equal to 2, greater than or equal to 3, greater than or equal to 5, greater than or equal to 10, greater than or equal to 50, greater than or equal to 100, greater than or equal to 500, greater than or equal to 1000, greater than or equal to 5000, greater than or equal to 10000, or greater than or equal to 100000 times greater than the arc length of the interface in the first configuration. In some embodiments, the magnitude of the arc length of the interface in the second configuration may be less than or equal to 1000000, less than equal to 100000, less than equal to 10000, less than equal to 5000, less than equal to 1000, less than equal to 500, less than equal to 100, less than equal to 50, less than equal to 10, less than equal to 5, less than equal to 3, less than or equal to 2, or less than or equal to 1.5 times greater than the magnitude of the arc length of the interface in the first configuration. Combinations of the above-referenced ranges are possible (e.g., greater than or equal to 1.1 and less than or equal to 1000000 times greater). Other ranges are also possible.

In some embodiments, the magnitude of the arc length of the interface may decrease upon exposure of the droplets to a stimulus. For example, the magnitude of the radius of curvature of the interface in the first configuration may be greater than or equal to 1.1, greater than or equal to 1.5, greater than or equal to 2, greater than or equal to 3, greater than or equal to 5, greater than or equal to 10, greater than or equal to 50, greater than or equal to 100, greater than or equal to 500, greater than or equal to 1000, greater than or equal to 5000, greater than or equal to 10000, or greater than or equal to 100000 times greater than the arc length of the interface in the second configuration. In some embodiments, the magnitude of the arc length of the interface in the first configuration may be less than or equal to 1000000, less than equal to 100000, less than equal to 10000, less than equal to 5000, less than equal to 1000, less than equal to 500, less than equal to 100, less than equal to 50, less than equal to 10, less than equal to 5, less than equal to 3, less than or equal to 2, or less than or equal to 1.5 times greater than the magnitude of the arc length of the interface in the second configuration. Combinations of the above-referenced ranges are possible (e.g., greater than or equal to 1.1 and less than or equal to 1000000 times greater). Other ranges are also possible.

Non-limiting examples of stimuli include a change in electromagnetic radiation (e.g., light), ionizing radiation, a magnetic field, an electric field, a mechanical force, adjusting the ionic strength of the outer component, adjusting the temperature of the outer component, exposing the plurality of droplets to photochemical stimulation, adding an analyte to the outer component, applying an electric or magnetic field, or combinations thereof.

In an exemplary set of embodiments, the article may be mechanically deformed (e.g., stretched, compressed, twisted, sheared) such that the structural coloration of the article changes. For example, an article comprising a plurality of microwells and/or domes may have a first arrangement of structural coloration. Upon mechanically deforming the article, the plurality of microwells and/or domes may exhibit a second arrangement of structural coloration, different than the first arrangement.

While much of the description above refers to changes in radius of curvature of an interface, those of ordinary skill in the art would understand that the interface not necessarily need to be curved. For example, in some embodiments, total internal reflection may occur on two portions of an interface (or a surface of an interface) which has two or more major orthogonal axes. That is to say, in some embodiments, the interface comprises a first geometric plane having a first orthogonal axis and a second geometric plane having a second orthogonal axis that intersects the first orthogonal axis (see e.g., FIG. 1B) Without wishing to be bound by theory, the presence of two or more geometric planes may result in total internal reflection of incident electromagnetic radiation. The angle between two adjacent portions of an interface may be any suitable angle (e.g., greater than or equal to 1 degree and less than 180 degrees, greater than or equal to 5 degrees and less than 90 degrees, greater than or equal to 10 degrees and less than 120 degrees, greater than or equal to 45 degrees and less than or equal to 135 degrees, greater than or equal to 90 degrees and less than 180 degrees).

The droplets, wells, domes, and/or particles described herein may have any suitable size. In some embodiments, the droplets, wells, domes, and/or particles have a largest cross-sectional dimension (e.g., diameter) of less than or equal to 1000 microns, less than or equal to 800 microns, less than or equal to 600 microns, less than or equal to 400 microns, less than or equal to 200 microns, less than or equal to 100 microns, less than or equal to 50 microns, less than or equal to 25 microns, less than or equal to 10 microns, less than or equal to 5 microns, or less than or equal to 2 microns. In certain embodiments, the droplets, wells, domes, and/or particles may have a largest cross-sectional dimension of greater than or equal to 1 micron, greater than or equal to 2 microns, greater than or equal to 5 microns, greater than or equal to 10 microns, greater than or equal to 25 microns, greater than or equal to 50 microns, greater than or equal to 100 microns, greater than or equal to 200 microns, greater than or equal to 400 microns, greater than or equal to 600 microns, or greater than or equal to 800 microns. Combinations of the above-referenced ranges (e.g., greater than or equal to 1 micron and less than or equal to 1000 microns) are possible. Other ranges are also possible.

In some embodiments, at least one of the two or more components comprises a hydrocarbon. Non-limiting examples of suitable hydrocarbons include alkanes (e.g., hexane, heptane, decane, dodecane, hexadecane), alkenes, alkynes, aromatics (e.g., benzene, toluene, xylene, benzyl benzoate, diethyl phalate), oils (e.g., natural oils and oil mixtures including vegetable oil, mineral oil, and olive oil), liquid monomers and/or polymers (e.g., hexanediol diacrylate, butanediol diacrylate, polyethylene glycols, trimethylolpropane ethoxylate triacrylate), alcohols (e.g., butanol, octanol, pentanol, ethanol, isopropanol), ethers (e.g., diethyl ether, diethylene glycol, dimethyl ether), dimethyl formamide, acetonitrile, nitromethane, halogenated liquids (e.g., chloroform, dichlorobenzene, methylene chloride, carbon tetrachloride), brominated liquids, iodinated liquids, lactates (e.g., ethyl lactate), acids (e.g., citric acid, acetic acid), liquid crystals (4-cyano-4'-pentylbiphenyl), trimethylamine, liquid crystal hydrocarbons (e.g., 5-cyanobiphenyl), combinations thereof, and derivatives thereof, optionally substituted. In some embodiments, the hydrocarbon comprises a halogen group, sulfur, nitrogen, phosphorus, oxygen, or the like. Other hydrocarbons are also possible.

In some embodiments, at least one of the two or more components comprises a fluorocarbon. Non-limiting examples of suitable fluorocarbons include fluorinated compounds such as perfluoroalkanes (e.g., perfluorohexanes, perfluorooctane, perfluorodecalin, perfluoromethylcyclohexane), perfluoroalkenes (e.g., perfluorobenzene), perfluoroalkynes, and branched fluorocarbons (e.g., perfluorotributylamine). Additional non-limiting examples of suitable fluorocarbons include partially fluorinated compounds such as methoxyperfluorobutane, ethyl nonafluorobutyl ether, 2H,3H-perfluoropentane, trifluorotoluene, perfluoroidodide, fluorinated or partially fluorinated oligomers, 2,2,3,3,4,4,5,5,6,6,7,7,8,8,9,9-hexadecafluorodecane-1,10-diyl bis(2-methylacrylate), perfluoroiodide, and 2-(trifluoromethyl)-3-ethoxydodecafluorohexane. Other fluorocarbons are also possible.

In some embodiments, at least one of the two or more components comprises a silicone such as silicone oil. Non-limiting examples of suitable silicone oils include polydimethylsiloxane and cyclosiloxane fluids.

In some embodiments, at least one of the two or more components comprises water.

In some embodiments, at least one of the two or more components comprises an ionic liquid (e.g., an electrolyte, a liquid salt). In some embodiments, at least one of the two or more inner components comprises an ionic liquid (e.g., an electrolyte, a liquid salt, 1-allyl-3-methylimidazolium bromide, 1-allyl-3-methylimidazolium chloride, 1-benzyl-3-methylimidazolium hexafluorophosphate, 1-butyl-1-methylpyrrolidinium hexafluorophosphate). In some embodiments, the outer component comprises water.

In certain embodiments, at least one of the two or more components comprises a deuterated compound (e.g., a deuterated hydrocarbon).

In some embodiments, at least one of the two or more components comprises a chlorinated solvent (e.g. chloroform, carbon tetrachloride).

Non-limiting examples of combinations of components present in the emulsion described herein include hexane and perfluorohexane, carbon tetrachloride and perfluorohexane, chloroform and perfluorohexane, hexane and perfluorodecalin, hexane and perfluoromethylcyclohexane, hexane and perfluorotributylamine, isopropanol and hexadecane, ethyl lactate and heptane, acetic acid and decane, and triethylamine and water. Other combinations and materials are also possible.

In some embodiments, at least one of the two or more components comprises a gas (e.g., a perfluoropentane gas, oxygen gas, nitrogen gas, helium gas, hydrogen gas, carbon dioxide gas, air).

In certain embodiments, at least one of the two or more components comprises a solid. Non-limiting examples of suitable solids include polymers, metals, oxides, ceramics, glasses, gels, crystals, carbides, alloys, carbon, ionic solids, and the like. Those of ordinary skill in the art would be capable of selecting suitable solid materials based upon the teachings of this specification (e.g., such that electromagnetic radiation at an interface between a solid component and a second component undergoes total internal reflection).

In some embodiments, at least one of the two or more components comprises a polymer (e.g., polyethylene glycol, polydimethylsiloxane). In certain embodiments, the polymer is a block copolymer. In certain embodiments, the polymer is a liquid crystal polymer (e.g., a thermotropic liquid crystal polymer). In certain embodiments, the polymer is a biopolymer (e.g. gelatin, alginate). Non-limiting examples of suitable polymers include polydimethylsiloxane, polycarbonate, acrylics (e.g., polymethyl methacrylate), polyesters, polyethylene, polyethylene glycol, polyolefins, polypropylene, and polystyrene. Other polymers are also possible and those of ordinary skill in the art would be capable of selecting such polymers based upon the teachings of this specification. In some embodiments, at least one of the two or more components comprises glass.

In some embodiments, at least one of the two or more components comprises a combination of the materials described above (e.g., comprising a hydrocarbon, a fluorocarbon, a silicone, a polymer, glass, a gas, or combinations thereof). Non-limiting examples of combinations of components present in the emulsion described herein include hexane and perfluorohexane, carbon tetrachloride and perfluorohexane, chloroform and perfluorohexane, hexane and perfluorodecalin, hexane and perfluoromethylcyclohexane, hexane and perfluorotributylamine, isopropanol and hexadecane, ethyl lactate and heptane, acetic acid and decane, polydimethylsiloxane and oil, and triethylamine and water. Other combinations and materials are also possible.

In some embodiments, at least one of the two or more components comprises a combination of the materials described above (e.g., comprising a hydrocarbon, a fluorocarbon, a silicone, or combinations thereof).

Non-limiting examples of combinations of components present in the plurality of droplets described herein include hexane and perfluorohexane, carbon tetrachloride and perfluorohexane, chloroform and perfluorohexane, hexane and perfluorodecalin, hexane and perfluoromethylcyclohexane, hexane and perfluorotributylamine, isopropanol and hexadecane, ethyl lactate and heptane, acetic acid and decane, and triethylamine and water. Other combinations and materials are also possible.

Those skilled in the art would be capable of selecting suitable components based upon the teachings of the specification and the examples below such that, in some embodiments, the two or more components are miscible under a given range of temperatures and are immiscible under a different range of temperatures, as described above.

The outer component (e.g., third component) may comprise any suitable material. Generally, the two or more components comprising the plurality of droplets may be substantially immiscible with the outer component, although the articles described herein are not intended to be so limited. In some embodiments, the outer component is an aqueous component (e.g., comprising water). In certain embodiments, the outer component is a non-aqueous component. In some embodiments, the non-aqueous component comprises a hydrocarbon, a fluorocarbon, a silicone, or the like, as described above in the context of the two or more components, substantially immiscible with the two or more components. In some embodiments, the outer component is a gas (e.g., air).

Those skilled in the art would be capable, based upon the teachings of the specification and the examples below, of selecting suitable materials for use as an outer component based upon the miscibility of those materials (e.g., such that the two or more components are substantially immiscible with the outer component) and/or the refractive index of those materials. The use of an non-aqueous outer component may be advantageous in certain applications where the emulsion is used in low humidity environments. For example, a plurality of droplets comprising fluorocarbon/hydrocarbon components can be created in a liquid silicone matrix. The silicone can be crosslinked of polymerized to change its mechanical properties. In some embodiments, at least a portion of the article (e.g., droplets, domes, wells) may be deformed and/or aligned by mechanically deforming (e.g., applying a mechanical force to) the outer component.

Articles described herein may be formed using any suitable method. For example, in some embodiments, an outer component material, a first component, and a second component are mixed and emulsified, forming an outer component and a plurality of droplets in the outer component having a first component and a second component at least partially encapsulated by the first component. Suitable methods for emulsifying the fluid are known in the art and may comprise sonication, high shear mixing, shaking, passing the fluid through a membrane, or injecting the two or more components into the outer component through a small diameter channel (e.g., a microchannel(s)).

In certain embodiments, the article may be formed by lithography (e.g., photolithography, laser lithography, stereolithography, soft lithography), by stamping, imprints and indentation, replica molding, polymerization of fluids, and/or assembly of solid particles.

In some embodiments, the article (e.g., droplets) can be formed by adjusting the temperature of a fluid comprising the outer component and the two or more immiscible components such that the two or more components become substantially miscible with each other, and emulsifying the fluid (e.g., thus forming the plurality of droplets). In certain embodiments, the method comprises adjusting the temperature of the fluid comprising the plurality of droplets such that the two or more components become substantially immiscible.

In certain embodiments, the outer component material, the first component, and the second component may be mixed at a temperature at which the first component material and the second component material are miscible. In some such embodiments, the temperature of the mixture may be changed (e.g., increased, decreased) to a temperature such that the first component and the second component are immiscible and form a plurality of droplets in the outer component having a first component and a second component at least partially encapsulated by the first component. While much of the description herein applies to two components, those skilled in the art would understand that such methods may be useful for the formation of colloids comprising a plurality of droplets having three or more, four or more, or five or more components. Additional suitable methods for forming articles comprising a plurality of droplets are described, for example, in co-owned U.S. Patent Publication Number 2016/0151753, entitled "Compositions and Methods for Forming Emulsions", filed Oct. 30, 2015; and in co-owned U.S. Patent Publication Number 2016/0151756, entitled "Compositions and Methods for Arranging Colloid Components", filed Oct. 30, 2015, each of which is incorporated herein by reference in its entirety.

In some embodiments, a portion of the plurality of droplets can be solidified (e.g., polymerized) such that a first configuration, a second configuration different than the first configuration, and/or a Janus droplet configuration solid droplets can be fabricated. Those skilled in the art will be capable of selecting appropriate materials for solidifying droplets and may include, in some embodiments, adding a crosslinker (e.g., a fluorinated acrylate) to the colloid such that the crosslinker crosslinks at least one of the two or more component, wherein the at least one of the two or more component comprises a crosslinkable polymer. In certain embodiments, solidifying droplets comprises adding a gelling agent (e.g., calcium-crosslinked alginate, gelatin, agar, or the like). In some embodiments, solidifying droplets comprises drying the droplets. In certain embodiments, solidifying droplets comprises changing the temperature such that one or more components solidify (e.g., a component comprising a liquid crystal or liquid crystal polymer that solidifies below the new temperature, a component comprising a liquid with a relatively high freezing point such that changing the temperature solidifies the liquid). Other methods of solidifying droplets are also possible and are known in the art.

The outer component may comprise any suitable material. In some embodiments, the outer component is a solid. In certain embodiments, the outer component is a liquid. In some embodiments, the outer component is a gel or a solid. Generally, the two or more components comprising the plurality of droplets may be substantially immiscible with the outer component. In some embodiments, the outer component is an aqueous component (e.g., comprising water, a hydrocarbon, a fluorocarbon). In certain embodiments, the outer component is a non-aqueous component (e.g., comprising a silicone, comprising a polymer, comprising an elastomer, comprising a glass). In an exemplary embodiment, the outer component is a polymer. In another exemplary embodiment, the outer component is an elastomer. In yet another exemplary embodiment, the outer component is a glass. In some embodiments, the non-aqueous component comprises a hydrocarbon, a fluorocarbon, a silicone, or the like, as described above in the context of the two or more components, and is substantially immiscible with at least one of the two or more components. The use of a non-aqueous outer component may be advantageous in certain applications including, but not limited to, tunable lenses.

Those skilled in the art would be capable, based upon the teachings of the specification and the examples below, of selecting suitable materials for use as an outer component based upon the miscibility of those materials (e.g., such that the two or more components may be substantially immiscible with the outer component). In some embodiments, the article comprises a plurality of droplets dispersed in the outer component wherein the outer component is a liquid (e.g., a liquid polymer, a gel precursor) and is solidified (e.g., polymerized) or gelled (e.g., crosslinked). Those skilled in the art would be capable of selecting suitable methods for solidifying or gelling the outer component.

While much of the description above relates to droplets, those of ordinary skill in the art would understand from the teachings of this specification how to form wells and/or domes for use in the articles described herein.

In some embodiments, the outer component is transparent (e.g., to a particular wavelength of electromagnetic radiation such as visible light) such that a particular wavelength of electromagnetic radiation (e.g., visible light) may be transmitted through the outer component and interact with the plurality of droplets described herein.

As used herein, a "fluid" is given its ordinary meaning, i.e., a liquid or a gas. A fluid cannot maintain a defined shape and will flow during an observable time frame to fill the container in which it is put. Thus, the fluid may have any suitable viscosity that permits flow. If two or more fluids are present, each fluid may be independently selected among essentially any fluids (liquids, gases, and the like) by those of ordinary skill in the art.

EXAMPLES

The following examples illustrate embodiments of certain aspects of the invention. It should be understood that the methods and/or materials described herein may be modified and/or scaled, as known to those of ordinary skill in the art.

Example 1

The following Example 1 describes the generation of tunable coloration from, for example, emulsion droplets and particles.

Figures 4A, 4B, 4C, 4D, 4E, 4F, 4G, 4H:
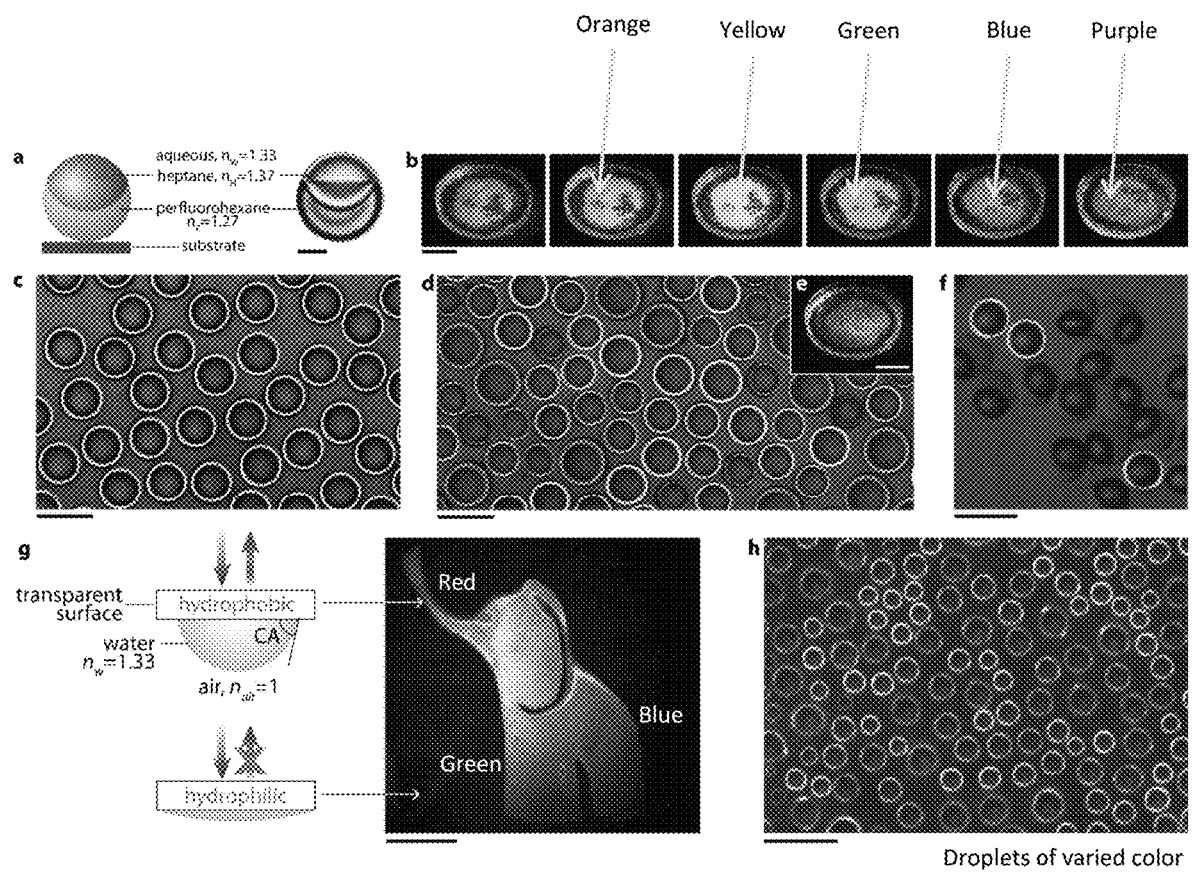
FIGS. 4A-4H show exemplary microscale concave surfaces display colorful iridescence in reflection, according to one set of embodiments.

The structural coloration effect was first observed within monodisperse, Janus oil droplets containing heptane (refractive index $n_H \approx 1.37$) and perfluorohexane ($n_F \sim 1.27$) dispersed in aqueous surfactant solution (FIG. 4A, see Methods for determination of refractive indices). These Janus droplets orient with gravity in a monolayer such that the droplet symmetry axis is perpendicular to the substrate. Upon illumination with collimated white light, droplets with an upward facing concave internal interface between the constituent oils exhibit intense angle-dependent coloration. (FIG. 4B). Microscopic observations of the droplets revealed that the colored light emanates from a ring near the three-component contact line, and that the same reflected color originates from each individual droplet regardless of the position of surrounding droplets. These observations suggested that the color is due to light-matter interactions within single droplets rather than a collective effect arising from periodic droplet organization (FIG. 4C). Polydisperse droplets with the same volume ratio of oils and contact angles but different sizes were found to exhibit color that is size-dependent (FIG. 4D); the resulting mix of colors gives rise to a glittery white appearance as seen by the unaided eye (FIG. 4E). Droplets that were polymerized into solid particles retained their reflected color. However, particles do not necessarily orient with gravity as well as the liquid droplets, highlighting the importance of the orientation of the hydrocarbon-fluorocarbon interface with respect to the light in generating the reflected colors, in some cases (FIG. 4F). In addition to the bicomponent droplets, it was also found that significant color separation occurs in sessile water droplets condensed onto a transparent, hydrophobic polystyrene petri dish (advancing contact angle, CA=70°) or onto polydimethylsiloxane (CA=90°) (FIGS. 4G-4H). Imaged with a microscope in reflection, these sessile droplets appeared similar to the biphasic oil droplets; the colored light again emanates from near the solid-liquid contact line and the effect is dependent on droplet size and contact angle (FIGS. 4I-4J). Solid polymeric hemispheres of comparable dimensions to the sessile drops show similar behavior.

Figures 5A, 5B, 5C, 5D, 5E:
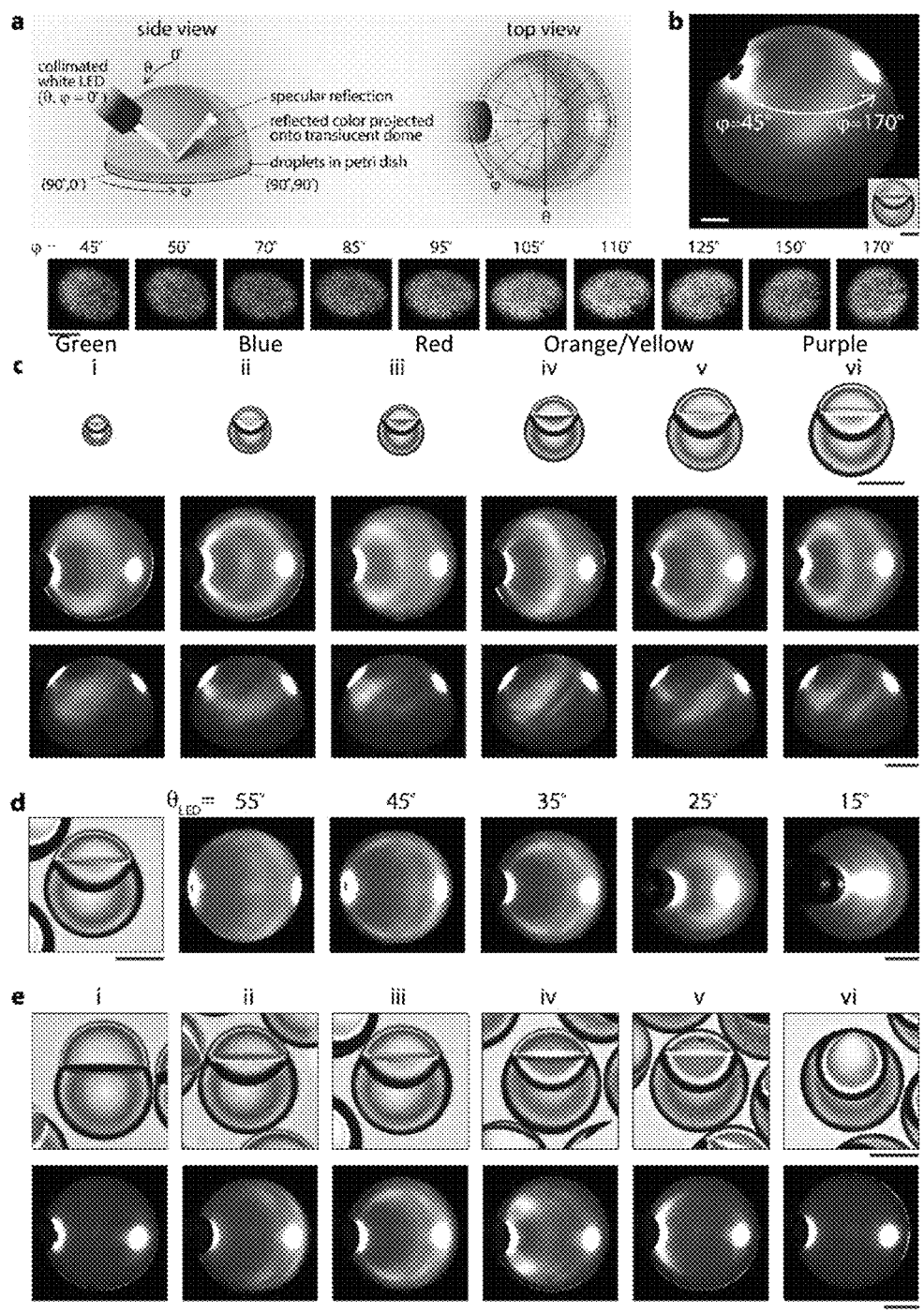
FIGS. 5A-5E shows exemplary biphasic droplet iridescence mapped in three dimensions for varying droplet size, illumination angle, and oil-oil curvature, according to one set of embodiments.

The reflected colors generally changed with differences in illumination and viewing direction, droplet or hemisphere size and shape. In order to capture the entire angular color distribution at once, a semi-translucent hemispherical screen was utilized onto which the reflected light was projected (FIG. 5A). By photographing the translucent hemispherical screen from above and from the side, all of the colors could be visualized for all viewing angles in a single image for a given illumination angle (FIG. 5B). The color patterns projected onto the hemispherical screen generally represented the colors seen by eye from different angles for the biphasic droplets (FIG. 5B). This spectral mapping technique allowed for systematic quantification of the color separation for many droplet configurations to characterize the impact of various parameters. This same spectral mapping technique also allows for quantification for the interference patterns observed for monochromatic illumination.

This technique was used to investigate the effects of droplet size, light illumination angle, and internal interface curvature on the droplet's light scattering characteristics. To observe the effect of droplet size, monodisperse droplets of the same morphology but with varying diameters were imaged under consistent illumination conditions (FIG. 5C). The angular separation between the colors for all samples is large (approximately 30-35°) and decreases slightly as droplet size increases. As the droplet diameter increases, the colors also cycle through their positions on the screen (FIG. 5C). While the color in a given direction varies with droplet size, the locations of dark zones in which no light is observed remain mostly static. A relationship between the color patterns with the illumination angle for any given droplet size and shape was also observed (FIG. 5D). To probe the influence of the curvature of the droplet's internal interface on the color, the droplet morphology was tuned between Janus and double emulsion configurations (FIG. 5E). The only shapes of droplets that reflect light when illuminated from above are those having a partially open and concave curvature between the two oils (e.g. droplets ii-v in FIG. 5E), and the perceived color at a given illumination and viewing angle was exquisitely sensitive to slight changes in the droplet-internal curvature.

It was evident that the color separation phenomenon is robust and highly generalizable to microscale concave interfaces with adjacent volumes of high refractive index and low refractive index media. This fact, in conjunction with the observation that the colored light emanates from near the three-component contact line of droplets with a concave internal interface, indicated that total internal reflection of light along the concave interface plays an important role. While total internal reflection at least partially explains how light is reflected from the interface with pronounced intensity, it alone cannot account for the observed color variations. Even additionally including material dispersion, which causes the colors in rainbows, can also not accurately describe the angular color separation nor the size-dependence in a simple ray-tracing model. Consequently, another optical mechanism may be at play. In general, iridescent structural colors rely on interference of light waves taking different paths through a material. Typically, such interference is created through surface or volume periodicity on the order of the wavelength of light (colloidal crystals, thin films, gratings), which is not present in this system. Therefore, it was hypothesized that the observed colors resulted from the interference of light that propagates by total internal reflection on different paths along the concave interface.

Figures 6A, 6B, 6C, 6D, 6E, 6F, 6G:
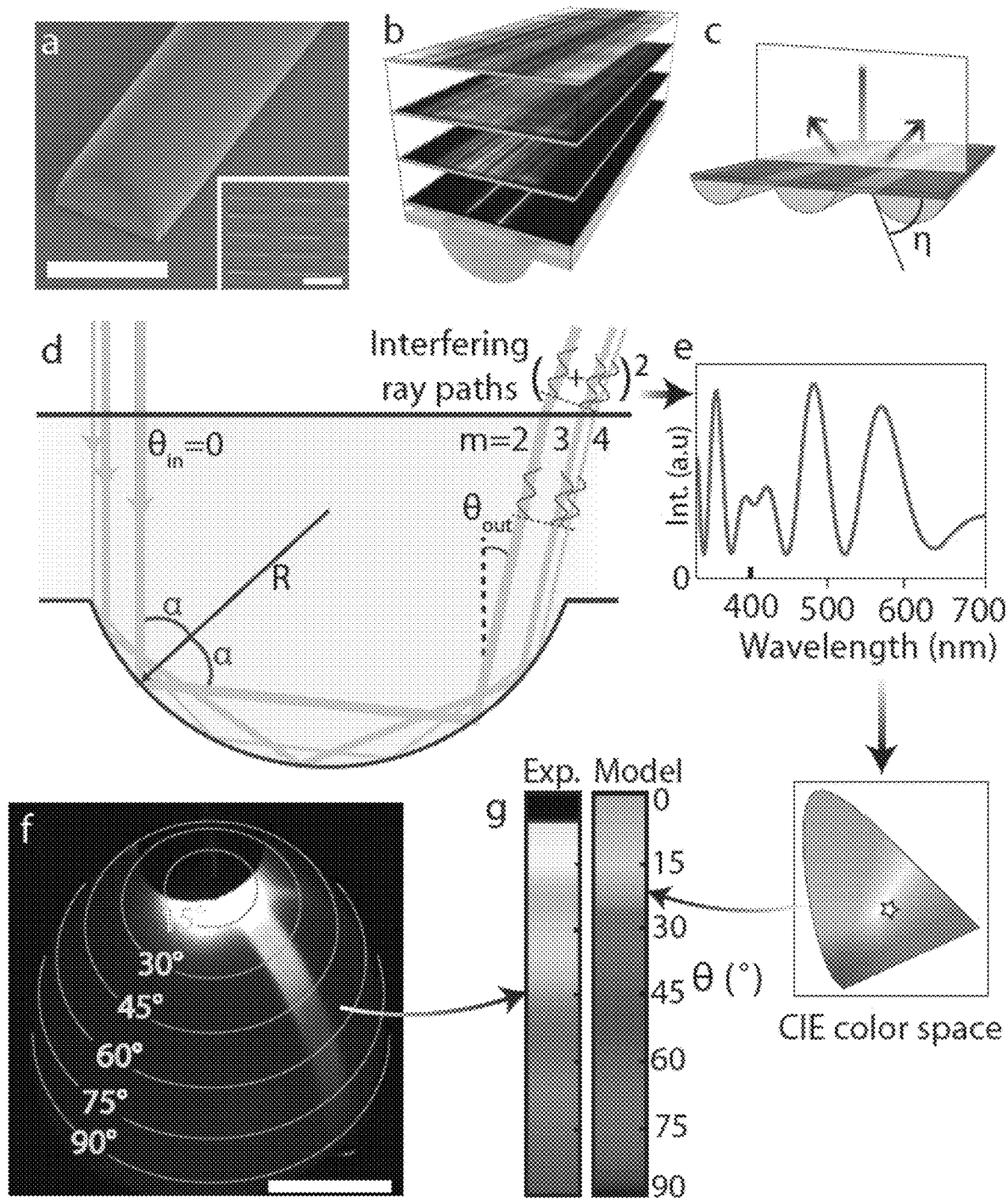
FIGS. 6A-6G show a 2D model of the iridescence phenomenon, according to one set of embodiments.

In order to test this hypothesis through theoretical optical modeling, the problem was initially simplified by considering a 2D system. A Nanoscribe (using multiphoton lithography) was used to print arrays of cylindrical segments and polygonal geometries of varying number of sides and observed reflected iridescent color for all structures that supported multiple pathways of total internal reflection. For in-depth theoretical and experimental analysis, the cylindrical structures were modeled (radius of curvature=10.64 μm, contact angle=70°, FIG. 6D,E,G) and probed their optical properties (FIG. 6B-G). Provided the incident light direction is perpendicular to the symmetry axis, the reflected rays are expected to all lie within the plane perpendicular to that axis. In this case, a 2D optical model suffices to explain the observed optical effects. The "ping-pong ball projection" was used technique to determine the reflected color as a function of angle (FIG. 6F), which provided a benchmark for in the 2D model. The interference of light in the cylindrical segments can be theoretically modeled by considering all the different paths that light can take along the interface and accounting for the total component accumulated on each trajectory (FIG. 6D). Summing the complex amplitudes of all light paths that are possible for a given angle of light incidence and a fixed observation direction allows the intensity as a function of wavelength, light incidence direction, and observation angle (FIG. 6E) to be deduced. From this spectral information, it can be determined the color that is theoretically observed and compare this data directly to the experimental results obtained with the ping pong ball screen (FIG. 6F-6G).

In order to model the interference as outlined above, all possible light paths were determined for a given light incidence angle $\theta_{in}$ and an observer in the direction $\theta_{out}$—both angles were measured from the normal of the cylindrical segment's horizontal plane (see FIG. 6D)—and then determined the component change along each path. A simple geometric relation connects the angles $\theta_{in}$, $\theta_{out}$, the local angle of light incidence $\alpha_m$, and the number of bounces m that the light undergoes (FIG. 6D):

$$\pi - \theta_{in} + \theta_{out} = m(\pi - 2\alpha_m) \Rightarrow \alpha_m = \frac{\pi}{2} - \frac{\pi - \theta_{in} - \theta_{out}}{2m} \qquad (1)$$

For simplicity, the refraction at the top interface was neglected in this equation, which can easily be accounted for with Snell's law. Not every value of m and $\alpha_m$ is possible; the bounds are discussed in detail in the supplementary information. Equation 1, along with the bounds on m, define all of the different paths that light can take for an illumination angle $\theta_{in}$ into the observation direction $\theta_{out}$. In order to determine the complex amplitude of light traveling along the different possible paths, each trajectory's optical path length was determined, as well as the component change upon each reflection. For a ray that undergoes m reflections, the physical path length $l_m$, measured from the plane perpendicular to the incoming light that intersects the center of curvature of the concave interface to the equivalent plane for the outgoing light amounts to:

$$l_m = 2R \cdot m \cdot \cos(\alpha_m) \qquad (2)$$

The component shift upon each reflection is given by the complex Fresnel reflection coefficients ($r_p$, $r_s$), which depend on the light polarization $\vec{p}$, the local angle of incidence $\alpha_m$, and the refractive index contrast $$\frac{n_1}{n_2}$$

of the concave structure ($n_1$) and the medium on the other side of the interface ($n_2$). The final complex amplitude for a ray of light that enters the dome with initial unit amplitude is then $$C_{m_s,p}(\theta_{in}, \theta_{out}) = r_{s,p}^m \cdot \exp\left(i\frac{2\pi n_1}{\lambda_0} \cdot l_m\right), \qquad (3)$$

where $\lambda_0$ is the wavelength measured in air. To reduce clutter in the following equations, the subscripts s,p were dropped for parallel and perpendicularly polarized light; nonetheless, this has accounted for light polarization in all calculations.

Figures 14A, 14B:
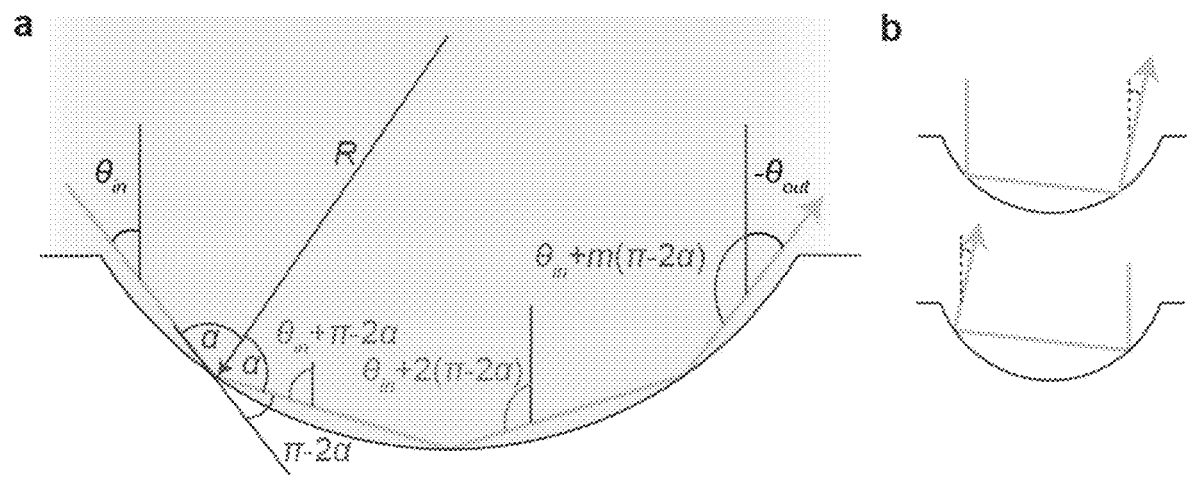
FIGS. 14A-14B show an exemplary diagram of (FIG. 14A) relationship between local incidence angle α, and global incidence and exit angle $\theta_{in}$ and $\theta_{out}$, according to one set of embodiments.

The total intensity $I_{total}$ of light traveling to an observer at angular position $\theta_{out}$ is the coherent sum of the complex amplitudes $C_m$ for the different possible ray paths, given by $$I_{total} = \left|\sum_{m_{min}}^{m_{max}} \sqrt{\frac{\cos(\alpha_m)}{m}} \exp\left(i\frac{2\pi n_1}{\lambda_0} 2Rm\cos(\alpha_m)\right) r^m\right|^2 \qquad (4)$$

where the amplitude scaling factor $$\sqrt{\frac{\cos(\alpha_m)}{m}}$$

accounts for the density of rays exiting at an angle $\theta_{out}$, as discussed in detail in the Supplementary Information. The bounds, $m_{min}$ and $m_{max}$, are set by the contact angle η of the cylindrical segment (marked in FIG. 6A), incidence angle $\theta_{in}$, and exit angle $\theta_{out}$. It is worth recognizing that for some choices of incidence and exit angles no possible light trajectory exists, leading to dark zones in the scattering projections. The sum in Equation 4 captures rays of light hitting one side of the concave interface, bouncing along that interface and leaving on the other side (see rays propagating from left to right in FIG. 14B). However, light with the same incidence angle can also strike the other side of the interface first and propagate in the other direction (inset in FIG. 14B), leaving the structure at the opposite end. This light can be represented in the model by accounting for the same pair of incidence and exit angles in reverse ($-\theta_{in}$, $-\theta_{out}$). This light exits the cylindrical segment at a distance farther than the coherence length of white light at the side opposite of where the light propagating in the other direction leaves. Therefore, it would not be expected that interference and consequently treat these two sets of paths as adding up incoherently:

$$I = \left|\sum_{m_{+min}}^{m_{+max}} \sqrt{\frac{\cos(\alpha_{m+})}{m}} \exp\left(i\frac{2\pi n_1}{\lambda_0} 2Rm\cos(\alpha_{m+})\right) r_+^m\right|^2 +$$

-continued $$\left|\sum_{m\_min}^{m\_max} \sqrt{\frac{\cos(\alpha_{m-})}{m}} \exp\left(i\frac{2\pi n_1}{\lambda_0}2Rm\cos(\alpha_{m-})\right)r_-^m\right|^2$$

with $\alpha_{m\pm} = \frac{\pi}{2} - \frac{\pi \pm (\theta_{out} - \theta_{in})}{2m}$.

The intensity thus generally varies as a function of input and output light directions, the radius of curvature, the refractive indexes, the polarization (minimally), the contact angle, and most importantly the wavelength of light, giving rise to the observed coloration. FIG. 6 shows the result of this summation for $(\theta_{in}, \theta_{out})=(0°, 13.09°)$ for a specific hemicylinder geometry. By converting the spectral information of light reflected into different angular directions into CIE color space coordinates, it could estimated that the color that would be seen from each specific observation direction. FIG. 6F shows the experimental iridescent color projections for cylindrical segments of 10.64 µm radius with contact angle $\eta=70°$, illuminated at $\theta_{in}=0°$ and the corresponding color separation predicted by the model for this particular structure. To match more closely the experimental conditions, the model data shown is averaged over an incoming light cone with a divergence half angle of 5°. The brightness of the experimental dataset was increased at large angles to better see the color. The two datasets match closely, providing support for the hypothesis that the color separation originates from the interference of total internally reflected light bouncing by different paths along the interface.

Figures 7A, 7B, 7C, 7D, 7E, 7F, 7G, 7H:
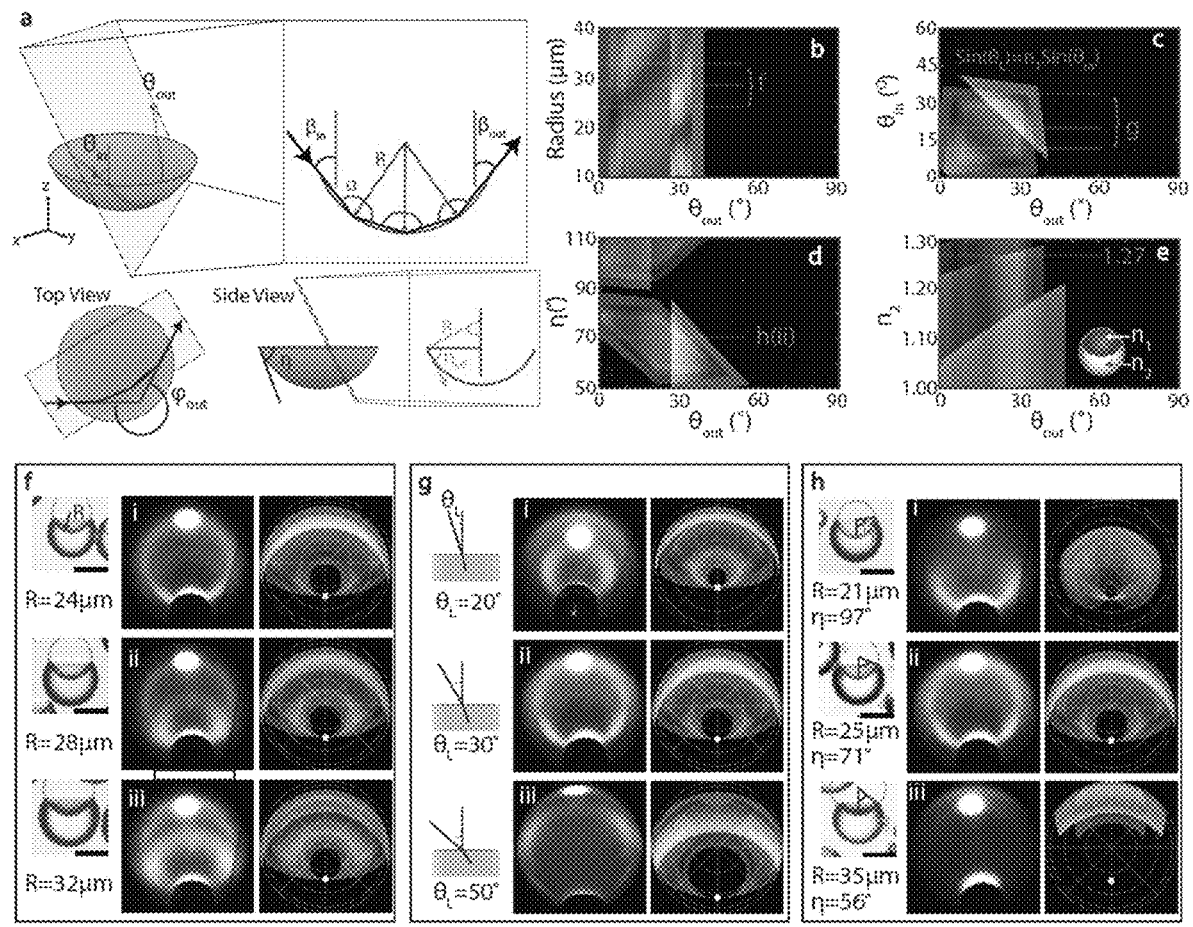
FIGS. 7A-7H shows the extension to 3D spherical interfaces and index matched Janus droplets, according to one set of embodiments.

Having developed a theory and model to explain the phenomenon in two dimensions, it was next aimed to expand the model's capacities to predict the scattering behavior of three-dimensional structures. For this, the biphasic droplets were used due to their ease of production and morphological control, but simplified the experimental system by index-matching the aqueous continuous component to the high index droplet component (heptane). This index matching allows for disregarding refraction at the droplets' curved upper interface, which otherwise would complicate the theoretical modeling without providing any substantial benefit for testing the validity of the model and hypothesis. The model can readily be extended to treat three-dimensional spherical caps by recognizing that all reflections occur within the plane containing the incoming ray of light and the center of curvature of the spherical interface. Within this plane, the problem is then identical to the above-described two dimensional case with modified angles $\beta_{in}$, $\beta_{out}$ for the incoming and outgoing light, and an effective opening angle $\eta_{eff}$ as shown in FIG. 7A.

This three-dimensional model was then used to better understand how various parameters such as radius of curvature, opening angle, illumination direction, and refractive index affect the observed colors. From Equation 5, it can be seen that the interference depends on the product $n_1 R$ in the optical path length and the refractive index contrast in the reflection coefficients. The allowed trajectories for specific illumination and observation directions are set by the global opening angle $\eta$ and the resulting opening angle $\eta_{eff}$. FIGS. 7B-7E shows how each of these parameters affects the colors observed as a function of observation direction given by the polar angle $\theta_{out}$ with the azimuthal angle $\varphi_{out}=180°$. The base conditions for these parameter space mappings are $R=36$ µm, $\eta=60°$, $\theta_{in}=30°$, $n_1=1.37$, and $n_2=1.27$. FIG. 7B shows the dependence of the coloration on the size of the cavity; as the radius of curvature R increases, the color patterns shift to larger angles and the spread of colors decreases, which is the same trend that was observed experimentally (FIG. 5C). The angular location of the color bands varies almost linearly as the illumination direction $\theta_{in}$ is adjusted. This can by understood by interpreting a change in illumination angle $\theta_{in}$ as a rotation of all ray paths around the center of curvature of the interface. Once rotated too far, a ray trajectory may no longer be available, which is evident in the sharp changes in color in FIG. 7C. The opening angle $\eta$, does not affect the optical path length or component change upon reflection; consequently, the location of the color bands are constant as $\eta$ is varied. However, whether a specific trajectory is possible strongly depends on $\eta$ (FIG. 7D). Regions of grey indicate that only one possible trajectory exists for a given pair of incidence and exit angles and thus there is no interference that could lead to color. The component change upon reflection is determined by the Fresnel reflection coefficients, which generally depend on the local angle of incidence $\alpha$, the polarization, and the refractive index contrast. The refractive index contrast can be tuned independently of other effects by adjusting only $n_2$ (FIG. 7E). The sharp change in colors corresponds to where total internal reflection begins to occur for a new light trajectory; a higher refractive index contrast also means more light undergoing total internal reflection; in reality, these separation lines are likely smoother than shown here, as this approach has only considered light that undergoes total internal reflection, but not light that is reflected with high amplitude close to the critical angle.

A comparison of this model in 3D for a number of droplet morphologies and illumination conditions was developed. In FIG. 7F the droplet size was varied but fixed the morphology and illumination angle. When the illumination is varied (FIG. 7G) it can be seen that the colors rotate with the illumination, and that the possible directions of color also change. Changing the morphology of the droplets changes both the radius of curvature as well as the opening angle as shown in FIG. 7H. In all of these cases a strong match between this interference model and the experimentally observed colors exists. In summary, a new design principle has been presented to generate structural colors by controlling the interference that occurs when light undergoes multiple total internal reflections at microscale interfaces without the necessity of nanoscale periodicity. Key requirements to leverage this effect include 1) refractive index interfacial contrast that supports total internal reflection and 2) a geometry that supports multiple pathways for total internal reflections. A detailed theory with predictive capabilities as verified by close matching of experimentally determined and modeled iridescence color patterns was presented. This theory allows for the rationalization of color patterns observed for variables such as change in radius of curvature, contact angle, and incident light angle. The optical effect may be leveraged within a wide range of materials and geometries including sessile droplets, biphasic droplets, solid particles, and polymeric microstructures with both curved and flat sides. The design principles laid forth will be of significant interest and use to scientists and engineers from a wide variety of fields who wish to modulate the color and reflective optical properties of materials.

Experimental

Chemicals:

All chemicals were used as received. Capstone FS-30 (Dupont); perfluorohexane(s) (98%) and 1H,1H,2H,2H-perfluorodecyl acrylate (97%) (Synquest Laboratories); Triton X-100 (Alfa Aesar); heptane (>99%) (MilliporeSigma); Sartomer CN4002 fluorinated oligomer (Arkema); 2-hydroxy- 2-methyl-1-phenylpropan-1-one (97%) (Ark Pharm Inc.); Sylgard 184 polydimethylsiloxane (PDMS) (Dow Corning); Norland Optical Adhesive 61 (Norland); Pluronic F-127 (bioreagent grade), sodium dodecyl sulfate (98%) and trimethylolpropane ethoxylate triacrylate ($M_n \approx 428$ g/mol) (Sigma-Aldrich).

Refractive Index Measurement of Droplet Oils:

Heptane and perfluorohexane were mixed in a 1:1 volume ratio at ambient temperature and allowed to component separate, simulating the fluid conditions inside the biphasic droplets. The two component-separated oil layers were then extracted and their refractive indices were measured using a J457FC refractometer at 20° C. (Rudolph Research Analytical). The refractive indices of the oils differ from the pure chemicals due to a low percentage of mutual solubility.

Fabrication of Droplets:

Fabrication of monodisperse emulsions was done using a flow focusing four-channel glass hydrophilic microfluidic chip with a 100 μm channel depth (Dolomite). Each inlet microchannel was connected to a reservoir of the desired liquids. The inlets for the inner component fluids (e.g. heptane and perfluorohexane) were connected to the reservoirs with 0.0025 inch ID, 1/16 inch OD PEEK 26 inches in length, and the outer component aqueous surfactant solution was connected to the reservoirs with 0.005 inch ID, 1/16 inch OD PEEK tubing 26 inches in length. The flow rate of each liquid was controlled by a Fluigent MFCS-EZ pressure controller. The pressure controller allowed for flow rate manipulation, providing the ability to vary the size and volume ratios of the liquids. Typical pressures used for the inner component fluids ranged from 1000 mbar to 7000 mbar and pressures for the outer component fluids ranged from 200 mbar to 3000 mbar. Varying ratios of Capstone FS-30 and Triton X-100 surfactants were used to tune the droplet shape via mechanisms described in detail elsewhere. While many concentrations and ratios of surfactants could be used, as an example aqueous solutions of 1.5 wt % Capstone FS-30 and 0.05 wt % Triton X-100 were often used to stabilize a morphology of droplet which produced the iridescence. Additional Capstone FS-30 and Triton X-100 could be added to tune the droplet shape as desired.

Fabrication of Particles:

Complex emulsions were created through the use of a 4-channel microfluidics apparatus as described in the section "Fabrication of Droplets". To make particles, monomers were used as the fluids for subsequent polymerization into particles. The hydrocarbon monomer was trimethylolpropane ethoxylate triacrylate with 5 v/v % photoinitiator, 2-hydroxy-2-methyl-1-phenylpropan-1-one. The fluorinated monomer was Sartomer CN4002 fluorinated oligomer mixed with 1H,1H,2H,2H-perfluorodecyl acrylate in a 3:1 volume ratio. 1 wt % Pluronic F-127 in water was used as the continuous component. PEEK tubing of 0.005 inch ID and ~2 foot long and pressures of 500 mbar were used for all four inlet flows. Once the droplets were fabricated, 1 wt % sodium dodecyl sulfate in water was added until the droplets exhibited a Janus shape that reflected light. Droplets were then polymerized into solid particles by curing under an OmniCure UV lamp (17 W/cm²) for 30 seconds.

Sample Imaging:

Microscopic imaging for determining droplet shape: The droplets were imaged using a Nikon Eclipse Ti-U inverted microscope. The droplets naturally orient with the denser fluorocarbon side downward, so to image the droplet profile, the emulsions were shaken in order to induce the droplets to roll onto their side and then the image was captured using a <1 ms exposure with an Image Source DFK 23UX249 color camera. To image droplets in reflection, an inverted microscope with a QImaging Micropublisher 3.3 RTV color camera was used.

Macroscopic imaging of droplet color: A monolayer of the emulsion droplets were placed in a petri dish with aqueous surfactant solution. The bottom of the dish was painted with black Artist's Loft acrylic paint. For large area illumination, an Amscope LED-50 W light with a collimating lens was used to illuminate the sample. For selected area illumination, a Thorlabs LED light (MWWHF2, 4000 K, 16.3 mW) equipped with a Ø200 μm fiber optic cable and collimating lens (CFC-2X-A) was used. The translucent dome used for the 3D color mapping of the iridescence was created by cutting a ping pong ball in half with a razor blade and drilling a 3 mm diameter hole in the ping pong ball with a Dremel Model 220. The ping pong ball dome was then placed on the 35 mm petri dish lid containing the emulsion and collimated light from the LED was passed through the hole into the center of the dish. All macroscale photographs were taken using a Canon EOS Rebel T6 DSLR camera mounted to an optical table and positioned at specific angles, as indicated in the primary text.

Reflection from Sessile Water Drops:

Sessile water drops were imaged using a Nikon Eclipse Ti-U inverted microscope (for microscopic imaging) or with a Canon EOS Rebel T6 DSLR camera (for macroscopic photographs). The water drops were created on transparent hydrophobic surfaces, such as PDMS or polystyrene petri dishes, by placing warm water in a petri dish under the room temperature hydrophobic substrate and allowing water to condense. The macroscale patterned reflectance image of the elephant was created using selected area UV-ozone treatment to increase the hydrophilicity of the polystyrene surface. A laser cutter was used to cut an elephant shape out of paper which was placed over the hydrophobic surface of the polystyrene petri dish used as a mask during UV-ozone treatment. Unexposed areas of the polystyrene remained hydrophobic, while UV-ozone treated areas were hydrophilic (low contact angle) and no longer supported total internal reflection and hence had no iridescent color.

Fabrication, Characterization, and Imaging of Polymer Domes and Cylinders

Nanoscribe fabrication. Arrays of solid domes, cylinders, and polygons were created using the Photonic Professional GT Nanoscribe. This equipment allows the user to three dimensionally print structures using multiphoton near-IR direct laser writing. Structures were printed onto fused silica glass slides with a 60× objective with the resist IP-Dip 65 (n=1.54) or IPS (n=1.51) using a 100 nm step size. The domes were computationally rendered with 3ds Max software and the cylinders were rendered with AutoCAD. Both renderings were converted into a DeScribe file format to import into the Nanoscribe. Uncured resist was cleaned with AZEBR for 20 minutes and isopropanol for 2 minutes.

Replication of Nanoscribe polymer structures into different polymers. Dow Corning Sylgard 184 PDMS was used to create a replica from the structures printed with the Nanoscribe. The PDMS base and hardener were mixed in a 10:1 mass ratio, mixed, poured over the Nanoscribed sample, and cured in an oven at 70° C. for at least two hours. The cured PDMS was peeled off of the structures to yield an array of wells. The PDMS mold could then be used to replicate the structures into different refractive index polymers, such as Norland Optical Adhesive (NOA) 61 (n=1.56). After allowing the polymer to fill the PDMS wells, the sample was backed with glass, and the resin was cured using a UV lamp (17 W/cm², 20 seconds). The NOA 61 was then peeled out of the PDMS mold to yield an array of replicated structures.

Effect of refractive index contrast. Domes fabricated in NOA 61 (n=1.56) on a glass substrate could be placed in various solvents to observe the effects on refractive index contrast on the color. In Supplementary Video 2, the domes were imaged in reflection using a Nikon Ti-U Eclipse and Image Source DFK 23UX249 color camera. NIS-Elements software was used to record a video of the reflected colors as methanol evaporated off the surface.

Example 2

The following Example 2 describes the fabrication of responsive microdomes and wells with structural coloration by multiple total internal reflection interference.

Structural colors, which are often caused by interference generated due to light interactions with physical features within or on the surface of a material, are commonly generated by well-known mechanisms such as photonic crystals, diffraction gratings, and thin films. Unlike the color generated from dyes and pigments, structural colors are generally influenced by parameters such as material refractive index, geometry, illumination angle, and viewing direction, which is of interest for applications utilizing dynamic coloration such as sensors or displays.

As described herein, structural coloration can also be produced when light undergoes multiple total internal reflections (TIR) at concave microscale interfaces. Without wishing to be bound by theory, light rays propagating by different trajectories of TIR along an interface, for instance by bouncing different numbers of times at a concave surface, have varying path lengths and a subsequent shift in phase, leading to interference that creates brilliant angle-dependent colors with large spectral separation. Unlike the precise nanoscale periodicity generally required to create structural color from diffraction gratings, photonic crystals, or multilayers, the optical interference created by multiple TIR can be generated at concave interfaces with dimensions on the ten to hundred microns scale. For example, structural color generated via this mechanism can be observed in microscale materials as simple as water drops condensed on a hydrophobic surface, oil-in-water emulsions, or Janus microparticles. These distinctly different geometric requirements thus provide opportunities for controlling structural color on the microscale, enabling use of such structural coloration in materials where it previously would have not been possible.

A simple fabrication route was used to form polymeric microwell and microdome surfaces that display structural color from TIR interference and explore experimentally the optical properties of such surfaces in conditions such as varying refractive index and mechanical deformation. Starting with commercially available glass monodisperse microparticles of varying size, oil-water interfaces were used to control the particle assembly and wetting such that microdome arrays of controllable contact angle and dimeter are easily fabricated on the centimeter scale. The micropatterned surfaces can then be replicated via soft lithography into a range of polymeric materials of varying refractive index and mechanical properties. The iridescent spectral characteristics of the microdome and microwell arrays were examined as a function of dome diameter, contact angle, and refractive index contrast, including providing examples of how to sensitize the color to stimuli such as temperature by using liquid crystals. Elastomeric surfaces can be mechanically stretched to study the effect asymmetry in the ellipsoidal structures on the iridescent the color.

Figures 9A, 9B, 9C, 9D, 9E, 9F:
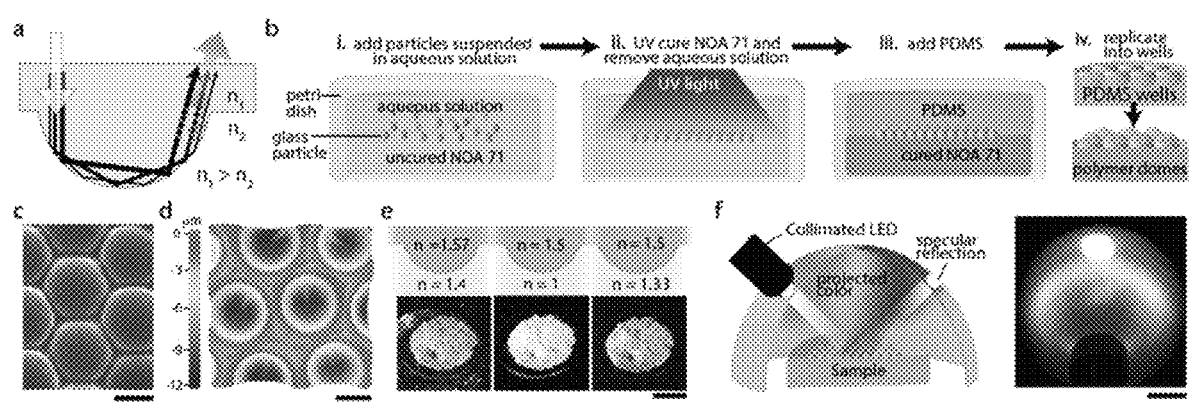
FIGS. 9A-9F illustrates the fabrication of exemplary microwells and domes with structural coloration due to interference from multiple TIR, according to one set of embodiments.

In order to create surfaces with microscale hemispherical domes (or wells) that support multiple trajectories of TIR (FIG. 9A), it was anticipated that a simple approach for large areas patterning may be by partially embedding monodisperse spherical particles at uniform depth within a polymer film. The fabrication method is outlined in FIG. 9B. In brief, a thin layer of uncured Norland Optical Adhesive 71 (NOA 71) was poured into a Petri dish followed by an aqueous solution of soda lime glass particles (40-43 µm diameter, 2.5 g/cc) in 1 mM hexadecyltrimethylammonium bromide (CTAB) aqueous surfactant. The CTAB rendered the particles sufficiently hydrophobic to wet the NOA 71 and partially sink into the oil-water interface. Ultraviolet (UV) light exposure was used to cure the NOA 71 and fix the particles in place. The aqueous phase was then washed away, leaving behind an array of glass spheres partially embedded in polymer. This surface of partially-embedded glass particles already displays structural color due to the relatively close refractive index matching between the glass bead and the NOA 71 which allows TIR to occur. However, an inverse replica, or mold, of this domed surface could also be fabricated that allows the domes (or wells) to be created in a wider range of materials. Typically, the replication was achieved by polydimethylsiloxane (PDMS) molding to form an array of wells. Characterization of the PDMS replica by scanning electron microscopy (SEM) and optical profilometry revealed a uniform array of wells of consistent depth with smooth surfaces (FIG. 9C, D) Scale, 20 µm. Upon filling the PDMS wells (refractive index n=1.4) with a higher refractive index fluid (benzyl benzoate, n=1.57) to enable TIR, observed bright iridescent colors were observed under white light illumination (FIG. 9E) Scale, 5 mm. The PDMS wells could be subsequently used as a mold to replicate into polymer domes of various materials. Polymer domes of an epoxy, OG 142-87 (n=1.5) also appeared somewhat iridescent in air (n=1), but due to the very high refractive index contrast, a significant amount of white specular reflection dulled the colors (FIG. 9E). Submerging the epoxy domes in water (n=1.33) to reduce the refractive index contrast yielded more pure colors very similar to the PDMS wells filled with benzyl benzoate (FIG. 9E). Because the surfaces were iridescent and displayed different colors as a function of viewing angle, reflections were mapped in three dimensions in order to fully characterize the spectral properties of the surface. In brief, the sample was illuminated by a collimated white LED introduced through a hole in the side of a translucent hemispherical screen (e.g. a half ping pong ball); the colored, reflected light from the sample is "projected" onto the inside of the translucent screen, allowing to correlate the reflected colors with specific positions in spherical coordinates (FIG. 9F) Scale, 1 cm. This fabrication method appeared suitable for the formation of microwells or microdomes that, upon interfacing with an appropriately high or low refractive index respectively, generate bright iridescent color from TIR interference.

Figures 10A, 10B:
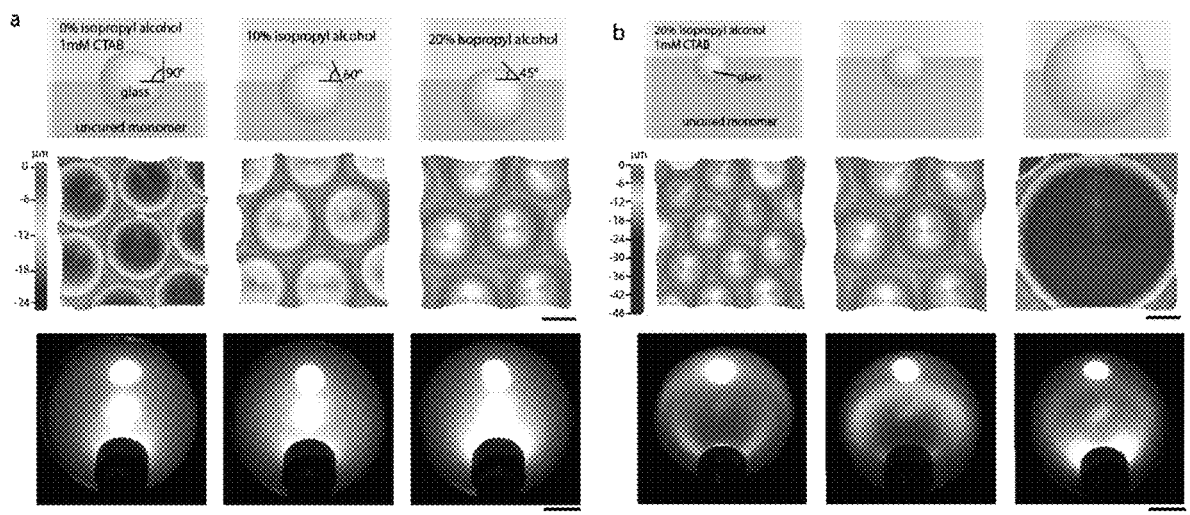
FIGS. 10A-10B depicts microwells and domes of varying depth and size, according to one set of embodiments.

Based on the elucidated mechanism of interference from TIR, the observed structural colors were expected to be dependent on the variables such as the contact angle and radius of curvature of the concave optical interface. Thus, these are key variables aimed to be able to control experimentally through this fabrication method. For a given particle size, the contact angle of the resultant microstructure array is simply dependent on the contact angle of the particle at the oil-water interface (e.g. how far the glass particle sinks into the oil). It was found that by varying concentrations of isopropyl alcohol in the water, the surface tension could be tuned and manipulated as to how far the glass particles penetrated into the oil monomer layer (FIG. 10A, Scale for middle row=20 µm, scale for bottom row=1 cm); particles that were more deeply embedded into the monomer resulted in domes with lower effective contact angle (and hence, shallower wells upon replication, FIG. 10B; scale for middle row=20 µm, scale for bottom row=1 cm). The radius of curvature was relatively most easily manipulated by simply starting with glass particles of varying diameter. Three sizes of particles (29-32 µm, 40-43 µm and 98-102 µm diameter) were used to create microstructure surfaces as outlined in FIG. 9 and test how the radius of curvature of the wells and domes affected the subsequent color pattern. As shown in FIG. 10B, all sizes tested did yield iridescent color, but the smaller particles had a much larger separation of the color bands while the largest 100 micron particles had a much smaller angular separation of wavelengths for the same pairings of refractive indices.

Figures 11A, 11B:
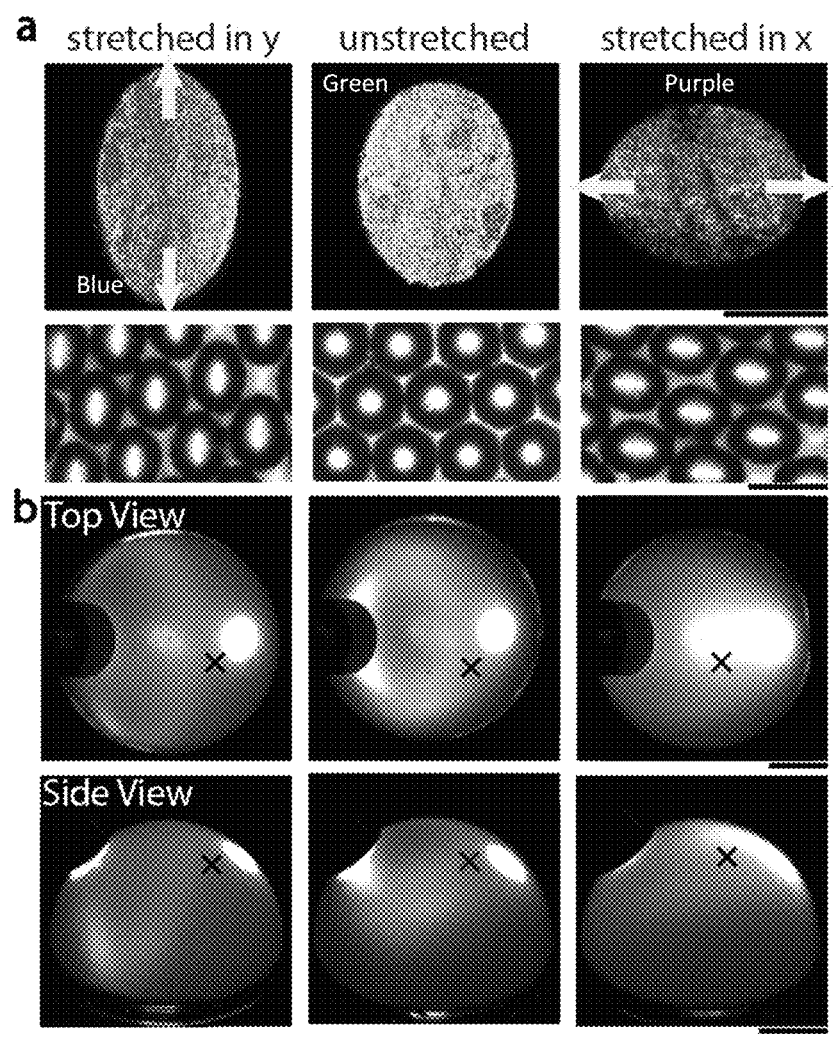
FIGS. 11A-11B show the response of microwells and domes deformed with mechanical force, according to one set of embodiments.

The conditions that gave the most vibrant color patterns were then used to examine the effect of responsive deformation from mechanical force. Stretchable PDMS wells (n=1.4) were filled with the higher index elastomer, Dowsil VE-6001 (n=1.53) which could be mechanically manipulated by stretching in different directions to form new colors FIG. 11A, scale for top row=1 cm, scale for bottom row=50 µm). This solid film of structural color allowed for elastically deformed while regaining its shape. To compare the stretchable films to a corresponding color pattern, permanently stretched domes of OG 142-87 were fabricated. These domes were replicated with the UV curable monomer from PDMS wells as they were stretched uniaxially to elongate their shape. These stretched domes were compared to symmetric OG 142-87 domes replicated from the same PDMS sample as the wells were relaxed. Each sample was submerged in water to give an index contrast that provided multiple TIR in order to observe their color patterns. This asymmetry gave an orientation dependence to the sample which the spherical domes lacked. The elongated domes from an oblique light angle (θ=50°) gave a stretched form of the symmetric dome pattern that rotated with the dome sample in respect to the incident light (FIG. 11B, scale=1 cm).

Figures 12A, 12B, 12C, 12D:
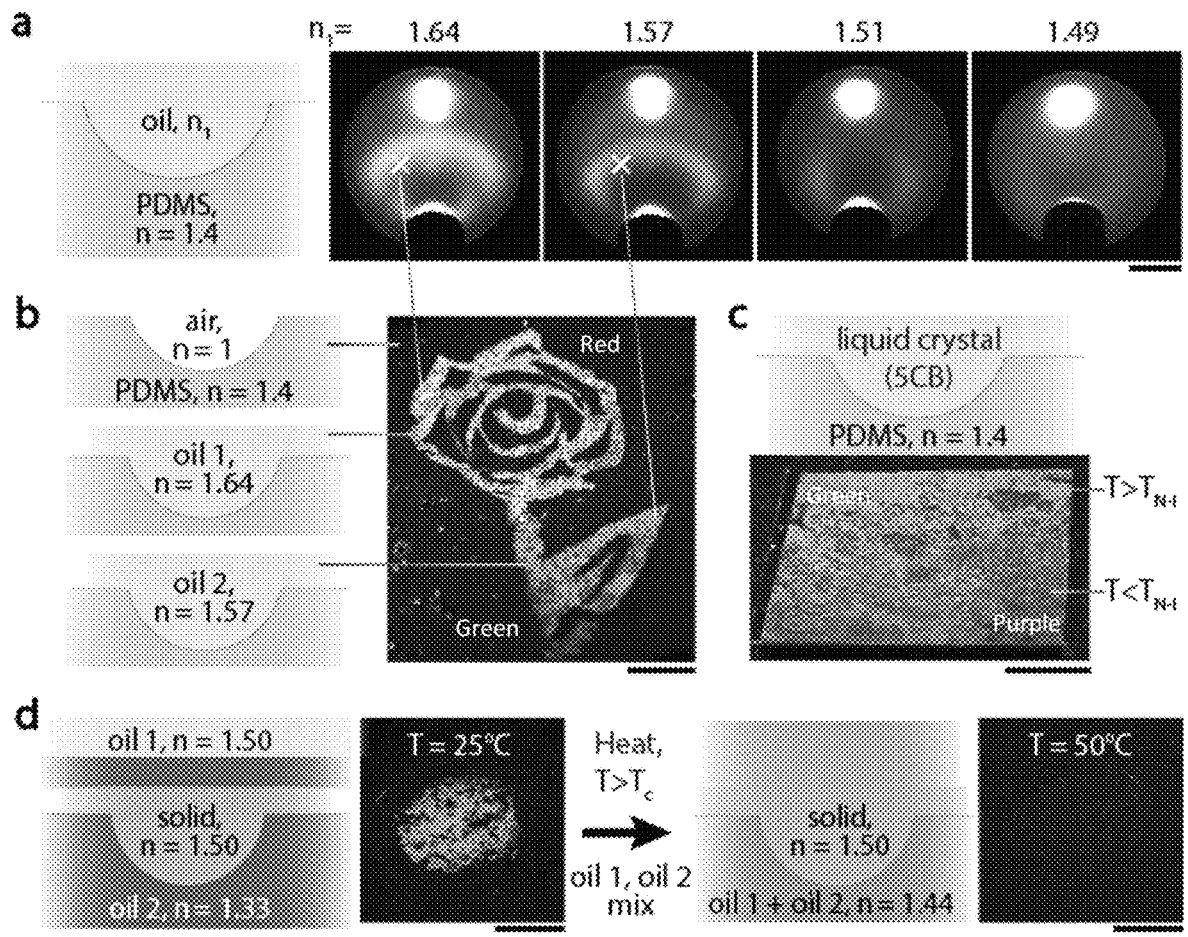
FIGS. 12A-12D illustrate varying color patterns of microwells with refractive index, according to one set of embodiments.

Using stimuli that effect the refractive index of either medium at the concave interface where multiple TIR propagate can also result in a responsive color change. The refractive index of a material that allows incident light to undergo TIR can affect its critical angle, which in turn influences how multiple TIR of incident light interferes to produce a subsequent color pattern. To first understand the effect of the refractive index between high index and low index media, mixtures of tetrabromoethane (n=1.64), benzyl benzoate (n=1.57) and n-decane (n=1.41) filled the PDMS wells (n=1.4). As shown in FIG. 12A (scale=1 cm), a refractive index difference of Δn=0.17 (n=1.57 to n=1.4) gave the most vibrant color, while PDMS wells filled with an index higher than n=1.62 or lower than n=1.5 appeared washed-out. Showing similar results to previous models, as the indices of the two materials increased, the difference between their indices must scale as well. This effect from varying the refractive index can then be harnessed to create dynamic changes to the color based on stimuli that affect the refractive index, such as temperature.

Thermally responsive color change was shown using the liquid crystal 4-cyano-4'-pentylbiphenyl (5CB) to fill PDMS wells. At room temperature, 5CB has a nematic orientation that aligns with the surface of the PDMS to give its own perceived color. This color interferes with the colored formed from multiple TIR of white light at the interface and produces less vibrant colors. As the sample is heated, the liquid crystal undergoes a phase transition into an isotropic state, no longer aligning with the surface of the PDMS to interfere with the multiple TIR of incident light, allowing for vibrant colors to be observed (FIG. 12C, scale=5 mm).

The color of a sample can further be thermally switched on and off by backing domes with two immiscible oils that, upon heating, mix to create a disparate index solution. This was shown in FIG. 12D (scale=5 mm) with NOA 71 (n=1.55) domes backed with the low index fluorinated oil, 2-(trifluoromethyl)-3-ethoxydodecafluorohexane (n=1.28) which supports multiple total internal reflections of incident light to give an iridescent color. A higher index hydrocarbon oil mixture of benzyl benzoate and toluene is then placed on top of the domes. As this sample is heated, the fluorinated and hydrocarbon oils begin to mix, causing the low index solution to increase to approximately n=1.45. The interface then loses the ability to propagate multiple total internal reflections, and the color disappears. The color can be reversibly turned on and off by heating and cooling the sample.

Finally, wells of PDMS were selectively filled to paint colorful images and generate an iridescent sketching effect (FIG. 12B, scale=1 cm). A capillary tube filled with benzyl benzoate (n=1.57) was placed onto an array of PDMS wells (n=1.4). As the capillary touched the sample, the wells filled with the benzyl benzoate, creating an iridescent color wherever the capillary tube landed. From this, any design could be drawn from iridescent color. Oils of two different refractive indices, benzyl benzoate (n=1.57) and tetrabromoethane (n=1.64), was used to paint an image of a rose with two different colors (FIG. 12B).

A new method of producing large area films of structural coloration through multiple total internal reflections were fabricated by embedding glass particles into the surface of UV curable monomers to create domes and wells of various materials. The effect of contact angle, size, shape and refractive index to manipulate the color of the films was investigated. These structures were replicated into responsive materials that can change color based on mechanical stimuli and temperature for applications from colorimetric sensing, dynamic displays or anticounterfeiting technology.

Experimental Procedures

Chemicals and materials: Hexadecyltrimethylammonium bromide (CTAB) (Fluka, >99.0%), isopropyl alcohol (VWR), Norland Optical Adhesive 71 (Norland), benzyl benzoate (99+%) (Alfa Aesar), n-decane (99+% (Alfa Aesar), 1,1,2,2-tetrabromoethane (>98.0%) (TCI), toluene (Fisher Science Education), 2-(trifluoromethyl)-3-ethoxydodecafluorohexane (Synquest Laboratories), perfluorooctane (TMC Industries), 4-cyano-4'-pentylbiphenyl (99%) (Frontier Scientific), Sylgard 184 polydimethylsiloxane (PDMS) (Dow Corning), Dowsil VE-6001 UV Optical Bonding (Dow Corning), PMS Black Silc Pig pigment (Smoothon), Sartomer CN4002 fluorinated oligomer (Arkema), soda lime glass particles (40-43 µm, 29-32 µm, 98-102 µm diameter, 2.5 g/cc) (Cospheric), OG 142-87 epoxy (Epotek)

Microdome and Microwell Fabrication Method

Uncured NOA 71 was placed into a thin layer in a petri dish. An aqueous solution of 1 mM CTAB with dispersed glass particles (40-43 µm, 29-32 µm, or 98-102 µm diameter) was pipetted onto the surface of the uncured NOA 71. The dense particles sank to the water-monomer interface, forming a monolayer. Isopropyl alcohol could be added to the particle solution in varying concentrations (0% v/v, 10% v/v and 20% v/v) to tune the depth the particles settled at the aqueous-monomer interface. The samples were then cured using an OmniCure UV lamp (mercury bulb, 17 W/cm$^2$) for 1 minute, fixing the silica particles into the cured optical adhesive. The aqueous phase was then removed and the sample was washed with reverses osmosis (RO) purified water and baked at 50° C. for 12 hours to complete the curing of the NOA 71. Dow Corning Sylgard 184 PDMS was then used to create an inverse replica from the soda lime silica particles fixed in the cured NOA 71. The PDMS base and hardener were mixed in a 10:1 mass ratio, mixed, poured over the polymer sample, and cured in an oven at 50° C. for at least two hours. The cured PDMS was peeled off the fixed particles to yield an array of wells. The PDMS wells could be used directly to create the structural color by filling the wells with a high refractive index oil, or the wells could be further used as a mold to fabricate domes of various polymers, such as OG 142-87.

Sample Imaging and Characterization

For large area sample illumination, an Amscope LED-50 W light with a collimating lens was used to illuminate the sample. For selected area illumination, a Thorlabs LED light (MWWHF2, 4000 K, 16.3 mW) equipped with a Ø200 μm fiber optic cable and collimating lens (CFC-2X-A) was used. The translucent dome used for capturing the iridescent color pattern was created by cutting a 40 mm diameter ping-pong ball in half with a razor blade and drilling a 3 mm diameter hole in the side with a Dremel Model 220. The ping-pong ball dome screen was then placed on top of the well or dome sample and collimated light from the LED was passed through the hole into the center of the sample. All macroscale photographs were taken using a Canon EOS Rebel T6 DSLR camera mounted to an optical table and positioned at specific angles, as indicated in the primary text. SEM images were taken using an FEI Nova NanoSEM 630. Profilometry images were taken using a Zygo NexView 3D Profilometer. Optical microscope brightfield images were taken using a Nikon Eclispe Ti-U inverted microscope and an Image Source DFK 23UX249 color camera.

Effect of Varying Refractive Index Contrast on Color

To test how the refractive index affects the perceived color (FIG. 4), PDMS wells replicated from 40-43 μm glass particles embedded in NOA 71 originally in an aqueous phase of 1 mM CTAB and 20 v/v % in isopropyl alcohol were filled with varying concentrations of tetrabromoethane, benzyl benzoate and n-decane to observe the effect of refractive index difference at the concave interface. The refractive indices of the oil mixtures were measured using a J457FC refractometer (Rudolph Research Analytical).

Mechanical Force Experiments

Stretchable films of well arrays were fabricated by removing cured NOA 71 with fixed soda lime silica particles (40-43 μm diameter) at the surface from its 5.5 cm petri dish and placing it in a larger 8.5 cm petri dish. PDMS was then poured over the polymer sample replicated to form wells indented into the PDMS. To reduce reflection from white spectral reflections, acrylic paint was added to the PDMS before thermally curing to tint the PDMS wells black. Dowsil VE-6001 filled these wells indented in the PDMS and another flat, transparent layer of PDMS with the same diameter was adhered to the surface of the black PDMS by first treating the surface with UV Ozone for 7 minutes. Once the indented wells were fully covered with a transparent layer of PDMS, the sample could be manipulated with mechanical force.

Fabricating Ellipsoidal Domes

A sample of glass particles (40-43 μm diameter) embedded in NOA 71 was prepared from an aqueous solution of 1 mM CTAB and 20 v/v % in isopropyl alcohol. PDMS wells were molded from the embedded particles. These wells were stretched using two metal clamps, filled with uncured OG 142-87, and then UV cured for 1 minute at 100% power of an OmniCure UV lamp (mercury bulb, 17 W/cm$^2$). The polymerized domes were then removed from the PDMS mold. The cured polymer was then removed and backed with water to give an index contrast that promotes vibrant iridescent color.

Liquid Crystal Heating

PDMS wells replicated from particles embedded in NOA 71 originally in an aqueous phase of 1 mM CTAB and 20 v/v % in isopropyl alcohol were filled with 5CB liquid crystal in its nematic state at room temperature. The wells were heated to 40° C., above the nematic to isotropic transition temperature, where the liquid crystal loses its birefringence and the resulting color became much more vibrant.

Drawing Structural Color Images in Microwells

PDMS wells replicated from particles (40-43 μm diameter) embedded in NOA 71 fabricated using an aqueous phase of 1 mM CTAB and 20 v/v % in isopropyl alcohol were selectively filled to create an image. 1.05 mm ID 1.5 mm OD borosilicate square capillary tubes (Harvard) were filled with benzyl benzoate and tetrabromoethane. Each oil filled selective wells as the capillary tube was dragged across the surface of the wells to create a two color rose image.

Temperature-Responsive Structural Color

PDMS wells were generated from particles (40-43 μm) embedded in NOA 71 originally deposited from an aqueous phase of 1 mM CTAB and 20 v/v % in isopropyl alcohol. Domes of OG 142-87 (n=1.50) were replicated from the PDMS wells and the surface was placed in a fluorinated oil, 2-(trifluoromethyl)-3-ethoxydodecafluorohexane (n=1.33), which gave a refractive index difference that generates coloration from multiple TIR. A 5:1 mixture of toluene to benzyl benzoate (n=1.50) was placed on top of the fluorinated oil with the dome array in a 3:1 volume ratio of hydrocarbon to fluorocarbon. At room temperature, the toluene and benzyl benzoate solution was immiscible with the fluorinated phase, but once heated to 35° C., the oils became miscible, raising the refractive index of the mixture to n=1.44. This high refractive index backing of the domes no longer supported TIR to produce structural color. Upon cooling back to room temperature, the fluids phase separated and color was again visible.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed.

The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

Any terms as used herein related to shape, orientation, alignment, and/or geometric relationship of or between, for example, one or more droplets, components, combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, alignment, and/or geometric relationship include, but are not limited to terms descriptive of: shape—such as, round, square, circular/circle, rectangular/rectangle, triangular/triangle, cylindrical/cylinder, elipitical/elipse, (n)polygonal/(n)polygon, U-shaped, line-shaped, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; arrangement—array, row, column, etc. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described. As another example, a plurality of droplets that would be described herein as being in an "array" would not require such droplets to have centers that are perfectly arranged in row and columns in which all major axes of the droplets are aligned (indeed, such an array can only exist as a mathematical abstraction), but rather, the arrangement of such droplets should be interpreted as approximating an "array", as defined mathematically, to an extent typically achievable and achieved for the recited fabrication technique as would be understood by those skilled in the art or as specifically described.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. An article, comprising:
a first component and a second component adjacent the first component; and a curved microscale interface between the first component and the second component, the interface configured such that at least a portion of electromagnetic radiation incident to a surface of the interface undergoes total internal reflection between the first component and the second component,
wherein the first component has a first refractive index greater than a second refractive index of the second component; and
wherein the electromagnetic radiation undergoes a change in amplitude during total internal reflection.

2. An article as in claim 1, wherein the curved interface is concave relative to the incident electromagnetic radiation.

3. An article as in claim 1, wherein stimulating the article produces a change in the electromagnetic radiation, different than a change in the electromagnetic radiation undergoing total internal reflection in the absence of the stimulation.

4. An article as in claim 3, wherein the stimulation is selected from the group consisting of heat, cold, light, mechanical force, electromagnetic radiation, ionizing radiation, a magnetic field, an electric field, an analyte, a reaction, a change in concentration of an analyte, and combinations thereof.

5. An article as in claim 1, wherein the first component or the second component comprises a fluid.

6. An article as in claim 1, wherein the interface comprises a first geometric plane having a first orthogonal axis and a second geometric plane having a second orthogonal axis that intersects the first orthogonal axis.

7. An article as in claim 1, wherein the interface has a defined radius of curvature.

8. An article as in claim 1, wherein the first component comprises a polymer.

9. An article as in claim 1, wherein the second component comprises a fluid.

10. The article of claim 1, wherein the curved, microscale interface comprises a surface of a hemicylindrical structure or a hemispherical structure.

11. The article of claim 1, wherein the article exhibits structural coloration due to the total internal reflection.

12. The article of claim 1, wherein the article exhibits iridescence due to the total internal reflection.

13. The article of claim 1, wherein the article exhibits optical interference due to the total internal reflection.

14. The article of claim 1, wherein the curved, microscale interface exhibits a largest cross-sectional dimension of from 1 micron to 200 microns.

15. An article, comprising:
a plurality of domed structures formed on a substrate, the substrate comprising a first material;
a second component adjacent the plurality of domed structures and comprising a second material;
wherein the first material has a refractive index greater than a refractive index of the second material, such that incident electromagnetic radiation undergoes total internal reflection at a curved surface of each domed structure at a microscale interface between the first material and the second material.

16. The article of claim 15, wherein the domed structures comprise hemicylindrical structures.

17. The article of claim 15, wherein the domed structures comprise hemispherical structures.

18. The article of claim 15, wherein the electromagnetic radiation undergoes a change in amplitude during total internal reflection.

19. The article of claim 15, wherein the article exhibits structural coloration due to the total internal reflection.

20. The article of claim 15, wherein the article exhibits iridescence due to the total internal reflection.

21. The article of claim 15, wherein the article exhibits optical interference due to the total internal reflection.

22. The article of claim 15, wherein the plurality of domed structures are disposed in a regular two-dimensional array on the substrate.

23. The article of claim 15, wherein the microscale interface comprises a polygonal interface.

24. The article of claim 15, wherein the microscale interface comprises an irregular interface.

25. The article of claim 15, wherein the plurality of donned structures each exhibit a largest cross-sectional dimension of from 1 micron to 200 microns.

* * * * *